(12) United States Patent
Mair et al.

(10) Patent No.: US 8,739,613 B2
(45) Date of Patent: Jun. 3, 2014

(54) METHOD OF DETECTING MISFIRE IN AN INTERNAL COMBUSTION ENGINE

(75) Inventors: Andreas Mair, Oberschlierbach (AT); Thomas Thurner, Graz (AT)

(73) Assignee: BRP-Powertrain GmbH & Co. KG, Gunskirchen (AT)

( * ) Notice: Subject to any disclaimer, the term of this patent is extended or adjusted under 35 U.S.C. 154(b) by 18 days.

(21) Appl. No.: 13/696,185

(22) PCT Filed: May 6, 2011

(86) PCT No.: PCT/IB2011/001373
§ 371 (c)(1),
(2), (4) Date: Dec. 12, 2012

(87) PCT Pub. No.: WO2011/138677
PCT Pub. Date: Nov. 10, 2011

(65) Prior Publication Data
US 2013/0125633 A1     May 23, 2013

Related U.S. Application Data

(60) Provisional application No. 61/331,893, filed on May 6, 2010.

(51) Int. Cl.
*G01M 15/11* (2006.01)
*G01M 15/12* (2006.01)
*F02D 35/02* (2006.01)

(52) U.S. Cl.
CPC ............. *G01M 15/11* (2013.01); *G01M 15/12* (2013.01); *F02D 2200/1015* (2013.01); *F02D 35/027* (2013.01)
USPC ..................................... 73/114.02; 73/114.07

(58) Field of Classification Search
CPC .................. G01M 15/11; G01M 15/12; F02D 2200/1015; F02D 35/027
USPC .......................................... 73/114.02, 114.07
See application file for complete search history.

(56) References Cited

U.S. PATENT DOCUMENTS

| | | | | |
|---|---|---|---|---|
| 4,586,369 A * | 5/1986 | Vogler | ....................... | 73/114.07 |
| 5,387,253 A | 2/1995 | Remboski et al. | | |
| 5,893,897 A * | 4/1999 | Volkart et al. | ................. | 701/110 |
| 6,388,444 B1 * | 5/2002 | Hahn et al. | .................... | 324/378 |

(Continued)

FOREIGN PATENT DOCUMENTS

| | | |
|---|---|---|
| EP | 1116945 A2 | 7/2001 |
| WO | 2009/067804 A1 | 6/2009 |

OTHER PUBLICATIONS

International Search Report from PCT/IB2011/001373; Oct. 14, 2011; Hallback, Ann-Sofie.

*Primary Examiner* — Freddie Kirkland, III
(74) *Attorney, Agent, or Firm* — BCF LLP

(57) ABSTRACT

A method of detecting misfire in an internal combustion engine comprises: sensing a temporal signature of a lateral displacement of the engine, performing a spectral analysis of the temporal signature of the lateral displacement to extract a magnitude of a predetermined frequency, and determining that misfiring in at least one of the plurality of cylinders has occurred based on the magnitude of the predetermined frequency. The predetermined frequency is associated with one of a plurality of orders of the engine. The one of the plurality of orders is representative of engine displacement due to in-cylinder pressures. Other methods of detecting misfire and a vehicle are also presented.

23 Claims, 16 Drawing Sheets

(56) References Cited

U.S. PATENT DOCUMENTS

| | | |
|---|---|---|
| 7,021,128 B2 * | 4/2006 | Rauchfuss et al. ......... 73/114.07 |
| 7,571,640 B2 * | 8/2009 | Andrews .................... 73/114.07 |
| 7,747,380 B2 * | 6/2010 | Chauvin et al. .............. 701/111 |
| 7,752,900 B2 * | 7/2010 | Galtier et al. .............. 73/114.02 |
| 8,078,389 B2 * | 12/2011 | Huang et al. .................. 701/114 |
| 8,108,131 B2 * | 1/2012 | Huang et al. .................. 701/110 |
| 2010/0286891 A1 * | 11/2010 | Huang et al. .................. 701/102 |

* cited by examiner

METHOD OF DETECTING MISFIRE IN AN INTERNAL COMBUSTION ENGINE

CROSS-REFERENCE

The present application claims priority to U.S. Provisional Patent Application No. 61/331,893, filed May 6, 2010, and entitled "Misfire Detection for Reciprocating Aircraft Engines", the entirety of which is incorporated herein by reference.

TECHNICAL FIELD

The present invention relates to methods of detecting misfire in an internal combustion engine.

BACKGROUND

An internal combustion engine includes a plurality of cylinders. Each cylinder has a combustion chamber in which the combustion process takes place. The combustion is initiated in each of the cylinders in a sequenced manner. If in one or more of the engine cylinders the combustion process does not take place as it should be, the engine is said to have misfired. There are several causes of engine misfiring. Some of the most common ones include spark plugs or spark plug wires defects, or mechanical defects of the cylinders or the valves.

The combustion creates great pressure changes within the cylinder and resultant great torques on the engine. These torques cause the engine to vibrate and in some cases to displace. When the engine is misfiring, an abnormal engine displacement is created. This abnormal displacement can cause uncomfortable shaking of the vehicle or premature wear of components of the engine.

Traditional methods to detect if one or more cylinder has misfired include using a plurality of sensors which monitor the combustion in each of the cylinders. These sensors include one or more of exhaust gas sensors, pressure sensors, ion-current sensors. While information about which one of the cylinders is defective can be readily obtained, the rough environment the sensors operate in disfavours using such complex sensing system applied to each cylinder. In addition, the sensors are usually expensive and frequent replacement can hinder the practical application of such method. Other methods which exclude direct measurements use mathematical modeling. While the models answer some of the inconveniences of the direct measurements methods, the models include several assumptions which may render the output of the method inaccurate or imprecise. Furthermore, the models may require long processing time that may not allow real-time analysis.

Therefore, there is a need for a method of detecting misfiring in one or more of the cylinders of an internal combustion engine which can easily be implemented and is reliable.

SUMMARY

It is an object of the present invention to ameliorate at least some of the inconveniences present in the prior art.

In one aspect, a method of detecting misfire in an internal combustion engine is provided. The engine has a plurality of cylinders, a corresponding plurality of pistons, and a shaft operatively connected to the plurality of pistons. The shaft has a longitudinal axis about which the shaft rotates. The method comprises sensing a temporal signature of a lateral displacement of the engine via an acceleration sensor. The acceleration sensor senses the lateral displacement in at least one direction. The at least one direction is non-parallel relative to the longitudinal axis of the shaft. The acceleration sensor is connected to a control unit. The temporal signature is decomposable into a plurality of frequencies, associated magnitudes, and associated phase angles. Each of the plurality of frequencies is associated with a corresponding one of a plurality of orders of the engine. The method includes sending a signal corresponding to the temporal signature of the lateral displacement from the acceleration sensor to the control unit; processing the signal with the control unit. The processing comprises performing a spectral analysis of the temporal signature of the lateral displacement to extract a magnitude of a predetermined frequency. The predetermined frequency is associated with one of the plurality of orders of the engine. The one of the plurality of orders is representative of engine displacement due to in-cylinder pressures. The method includes determining that misfiring in at least one of the plurality of cylinders has occurred based on the magnitude of the predetermined frequency.

In a further aspect, the spectral analysis includes a Fourier decomposition of the temporal signature of the lateral displacement of the engine onto a plurality of Fourier base functions and their associated Fourier coefficients. Each of the plurality of Fourier base functions is associated with a corresponding one of the plurality of frequencies. The associated magnitudes are the associated Fourier coefficients.

In an additional aspect, when misfiring in the at least one of the plurality of cylinders has occurred, the magnitude of the predetermined frequency is a greatest magnitude from magnitudes associated with the plurality of frequencies obtainable from the spectral analysis.

In a further aspect, the predetermined frequency is half of a frequency corresponding to a speed of the engine.

In an additional aspect, the predetermined frequency is a lowest one of the plurality of frequencies.

In a further aspect, determining that misfiring in at least one of the plurality of cylinders has occurred based on the magnitude of the predetermined frequency includes comparing one of the magnitude and an increase of magnitude of the predetermined frequency with historical values of a corresponding one of the magnitude and increases of the magnitude of the predetermined frequency.

In an additional aspect, determining that misfiring in at least one of the plurality of cylinders has occurred based on the magnitude of the predetermined frequency includes comparing one of the magnitude and an increase of magnitude of the predetermined frequency with a corresponding one of predetermined magnitudes and predetermined increases of the magnitude of the predetermined frequency corresponding to a normal operating condition.

In a further aspect, when misfiring in the at least one of the plurality of cylinders has occurred, the magnitude of the predetermined frequency is a greatest magnitude from magnitudes associated with the plurality of frequencies obtainable from the spectral analysis. Determining that misfiring in at least one of the plurality of cylinders has occurred based on the magnitude of the predetermined frequency includes determining a plurality of magnitudes associated with a plurality of predetermined comparison frequencies, the plurality of predetermined comparison frequencies being other than the predetermined frequency; adding the plurality of magnitudes together to obtain a cumulated magnitude; comparing the magnitude of the predetermined frequency with the cumulated magnitude; and determining that misfiring in at least one of the plurality of cylinders has occurred when the magnitude of the predetermined frequency is greater than the cumulated magnitude.

In an additional aspect, the engine is a V-6 engine having two banks of three cylinders each. The predetermined frequency is a frequency corresponding to half of a speed of the engine. The order associated to the predetermined frequency is the $0.5^{th}$ order. The at least some of the plurality of frequencies include orders integers from 1 to 10.

In a further aspect, determining that misfiring in at least one of the plurality of cylinders has occurred based on the magnitude of the predetermined frequency includes determining a health condition of the engine based on the magnitude of the predetermined frequency and on the temporal signature of the lateral displacement of the engine; and comparing the health condition with a predetermined health condition value.

In an additional aspect, the method further comprises determining a cylinder in which firing should have occurred when misfiring in at least one of the plurality of cylinders has been determined.

In a further aspect, determining a cylinder in which firing should have occurred includes determining a phase angle associated with the predetermined frequency; determining the engine speed; accessing a plurality of predetermined data, the plurality of predetermined data including a plurality of phase angles of the predetermined frequency versus engine speed data for when the engine has a distinct one of the plurality of cylinders in which misfiring has occurred; and correlating the phase angle and the engine speed with the plurality of predetermined data to identify the cylinder in which firing should have occurred. The predetermined frequency is associated with phases angles which, for a given engine speed, are distinct when the engine has a distinct one of the plurality of cylinders in which misfiring has occurred.

In an additional aspect, determining a cylinder in which firing should have occurred includes switching off the plurality of cylinders one by one until a resulting magnitude of the predetermined frequency decreases.

In another aspect, a method of detecting misfire in an internal combustion engine is provided. The engine has a plurality of cylinders, a corresponding plurality of pistons, and a shaft operatively connected to the plurality of pistons. The shaft has a longitudinal axis about which the shaft rotates. The method comprises sensing a temporal signature of a lateral displacement of the engine via an acceleration sensor. The acceleration sensor senses the lateral displacement in at least one direction. The at least one direction is non-parallel relative to the longitudinal axis of the shaft. The acceleration sensor is connected to a control unit. The temporal signature is decomposable into a plurality of frequencies, associated magnitudes, and associated phase angles. Each of the plurality of frequencies is associated with a corresponding one of a plurality of orders of the engine. The method includes sending a signal corresponding to the temporal signature of the lateral displacement from the acceleration sensor to the control unit; and processing the signal with the control unit. The processing comprises performing a spectral analysis of the temporal signature of the lateral displacement to extract magnitudes of at least some of the plurality of frequencies; adding the magnitudes of the at least some of the plurality of frequencies to obtain an added magnitude; and determining that misfiring in at least one of the plurality of cylinders has occurred based on the added magnitude.

In a further aspect, misfiring in at least one of the plurality of cylinders has occurred when the added magnitude is greater than one of an historical value of the added magnitude and a predetermined value of the added magnitude.

In yet another aspect, a method of detecting misfire in an internal combustion engine is provided. The engine has a plurality of cylinders, a corresponding plurality of pistons, and a shaft operatively connected to the plurality of pistons. The shaft has a longitudinal axis about which the shaft rotates. The method comprises sensing a temporal signature of a lateral displacement of the engine via an acceleration sensor. The acceleration sensor senses the lateral displacement in at least one direction. The at least one direction is non-parallel relative to the longitudinal axis of the shaft. The acceleration sensor is connected to a control unit. The method includes sending a signal corresponding to the temporal signature of the lateral displacement from the acceleration sensor to the control unit; filtering the signal with the control unit to obtain an engine displacement component associated with frequencies below a predetermined frequency and an engine displacement component associated with frequencies above the predetermined frequency; and determining that misfiring in at least one of the plurality of cylinders has occurred based on a comparison between the engine displacement component associated with frequencies below the predetermined frequency and the engine displacement component associated with frequencies above the predetermined frequency.

In an additional aspect, misfiring in at least one of the plurality of cylinders has occurred when the engine displacement component associated with frequencies below the predetermined frequency is greater than the engine displacement component associated with frequencies above the predetermined frequency.

In another aspect, a vehicle is provided. The vehicle comprises a frame. An internal combustion engine is mounted to the frame. The internal combustion engine includes a plurality of cylinders and a plurality of pistons. Each of the plurality of piston is movably connected to a corresponding one of the plurality of cylinders. A shaft is operatively connected to the plurality of pistons. The shaft has a longitudinal axis about which the shaft rotates. A plurality of engine mounts is provided for mounting the engine to the frame. An acceleration sensor is mounted on the engine. The acceleration sensor senses a temporal signature of a lateral displacement of the engine in at least one direction. The at least one direction is non-parallel relative to the longitudinal axis of the shaft. The temporal signature is decomposable into a plurality of frequencies, associated magnitudes, and associated phase angles. Each of the plurality of frequencies is associated with a corresponding one of a plurality of orders of the engine. A control unit is connected to the acceleration sensor. The acceleration sensor is sending a signal corresponding to the temporal signature of the lateral displacement to the control unit. The control unit is processing the signal. The processing consisting in performing a spectral analysis of the temporal signature of the lateral displacement to extract a magnitude of a predetermined frequency. The predetermined frequency is associated with one of the plurality of orders of the engine. The one of the plurality of orders is representative of engine lateral displacement due to in-cylinder pressures. The processing includes determining that misfiring in at least one of the plurality of cylinders has occurred based on the magnitude of the predetermined frequency.

In a further aspect, when misfiring in at least one of the plurality of cylinders has occurred, the magnitude of the predetermined frequency is the greatest magnitude from the magnitudes associated with the plurality of frequencies obtained from the spectral analysis.

In an additional aspect, determining that misfiring in at least one of the plurality of cylinders has occurred based on the magnitude of the predetermined frequency includes the control unit to compare the magnitude of the predetermined frequency with one of historical values of the magnitude of the predetermined frequency, predetermined magnitudes of the predetermined frequency corresponding to a normal operating condition, and a cumulated magnitude of magnitudes associated with a plurality of predetermined comparison frequencies, the plurality of predetermined comparison frequencies being other than the predetermined frequency.

In a further aspect, the engine is a V-6 engine having two banks of three cylinders each.

In an additional aspect, the shaft is one of a crankshaft and a camshaft of the engine.

In a further aspect, the vehicle further comprises an engine casing and a gear case. The acceleration sensor is disposed on one of an engine casing and a gear case of the engine.

For the purposes of this application, the term 'normal operating condition' refers to an engine in which the combustion process is normal. A normal combustion process is a process which is initiated by a timed spark, and in which the flame front moves completely across the combustion chamber in a uniform manner at a normal velocity. The term 'abnormal operating condition' refers to an engine in which the combustion process is abnormal, i.e. the combustion is incomplete within one or more of the cylinders. The term 'misfire' refers to an abnormal combustion. Misfire includes no firing, incomplete firing, or time lagged firing such that an abnormal pressure variation is present in the corresponding one or more cylinder. Misfire can be caused by various sources of defect. These sources include, but are not limited to, electrical (e.g. spark plugs) or mechanical (e.g. valves) defects. Throughout this application, it should be understood that the terms 'cylinder misfire' or 'cylinder misfiring' mean a cylinder inside which misfiring has occurred.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION

Although the present methods are being described herein in combination with an aircraft having propellers located on the wings, it is contemplated that other types of propeller aircraft, as well as motorized ground engaging vehicles could apply the present methods. For example, the methods could be in combination with an aircraft having a single engine located on the nose of the aircraft. Also, the present methods are described herein in combination with a V-6 reciprocating engine, but it is contemplated the present methods could be used with other internal combustion engines. For example, the present methods could be used with V-8 engines or in-lines engines.

Figure 1:
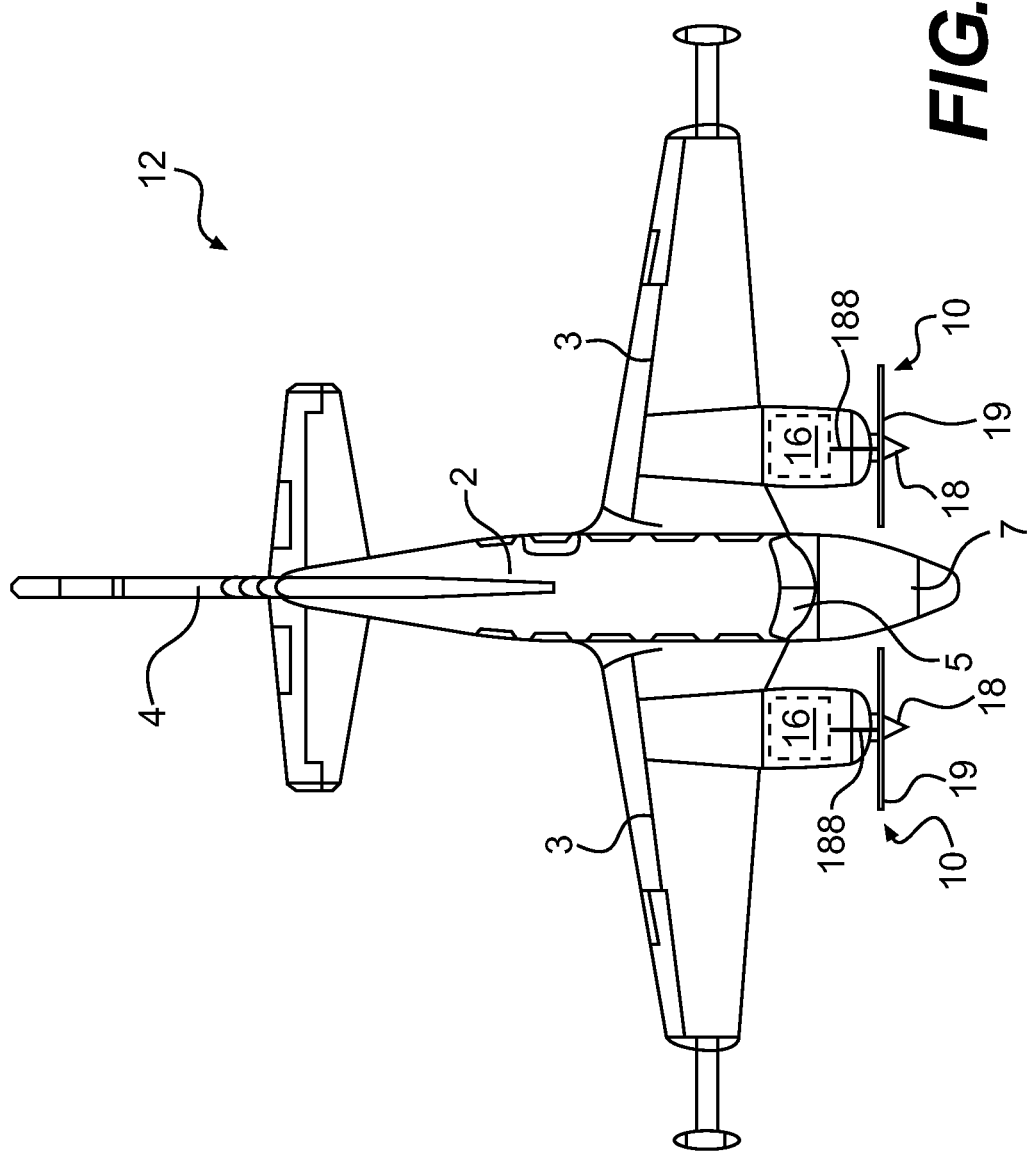
FIG. 1 is a top plan view of an aircraft.
Figure 2:
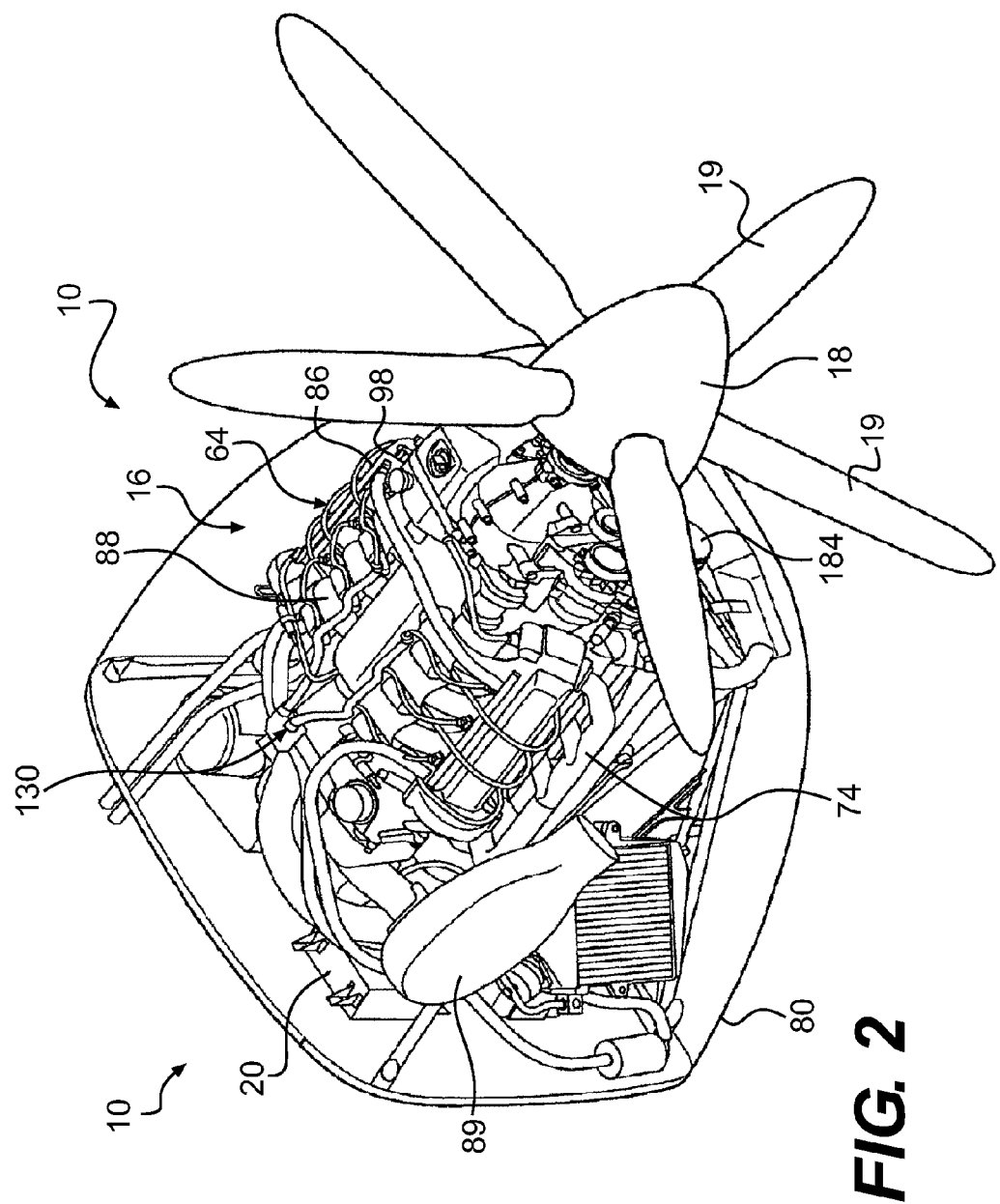
FIG. 2 is a top perspective view of a front right side of a propulsion assembly for the aircraft of FIG. 1 with a cowling in transparency to show an engine of the propulsion assembly.

Referring to FIG. 1, an aircraft 12 has a body 2, a pair of wings 3 (left and right), a tail 4 and a nose 7. Each of the wings 3 has an associated propulsion assembly 10. Each propulsion assembly 10 includes an internal combustion engine 16, a propeller shaft 188 that is operatively connected to the engine 16, and a control unit ("CU") 20 (shown in FIG. 2) that is electrically connected to the engine 16. The pilot controls the engines 16 from a cockpit 5 located toward the nose 7. The CU 20 is configured to monitor and control at least one operating parameter of the engine 16, as will be discussed in more detail below. The propeller shaft 188 is also operatively connected to a propeller 18. The propeller 18 has a plurality of blades 19 and is sized and designed so as to provide the proper propulsion for the aircraft 12. The aircraft 12 has other features which will not be described in greater details herein.

Turning now to FIGS. 2 to 6, only one of the internal combustion engines 16 will now be described, the other one of the internal combustion engines 16 being of similar construction. The engine 16 includes an engine casing 26 (sometimes referred as engine block) that forms the main structure of the engine 16 and contains and defines many of the internal features of the engine 16. The engine casing 26 is preferably made of aluminum, although other materials, including other light-weight materials, are also contemplated for construction of the engine casing 26. The engine casing 26 is constructed and arranged to define a crankcase 28 and a plurality of cylinders 30. The engine casing 26 is mounted to the aircraft 12 by a plurality of engine mounts 17. The engine mounts 17 include shock absorbing material to absorb some of the vibration and/or displacement of the engine casing 26.

The propeller shaft 188 is connected to the propeller 18 at one end and to a gear box 190, at an opposite end. The crankshaft 36 is also connected to the gear box 190 towards its front end. The gear box 190 includes a plurality of gears 192 that provide a speed reduction between the crankshaft 36 and the propeller shaft 188. The gear box 190 is also commonly known as a speed reduction unit or a propeller speed reduction unit in the art. The gear box 190 also includes a torsion bar 194 which is disposed between the crankshaft 36 and the propeller shaft 188 and provides stability to the system so that natural basic frequency of the overall drive line is reduced and higher frequency torsional oscillations are cushioned or reduced. The torsion bar 194 is connected to the crankshaft 36 by a sleeve 196.

The crankcase 28 houses a crankshaft 36 that is disposed along a longitudinal axis 102. The crankshaft 36 will be discussed in further detail below. The plurality of cylinders 30 includes six cylinders (30A, 30B, 30C, 30D, 30E, 30F) which extend upward from the crankcase 28. The cylinders 30 are arranged in two banks 21 of three aligned cylinders in a configuration commonly known as 'V-type'. The banks 21 are disposed at 120 degree from each other. It is contemplated that the banks 21 could be disposed at an angle other than 120 degrees from each other.

Each cylinder 30 slidably receives a piston 38. Each piston 38 is operatively connected to the crankshaft 36 via a connecting rod 40. Each connecting rod 40 is rotatably connected to one of the pistons 38 at one end and rotatably connected to the crankshaft 36 via a pin-type crankshaft journal 41 at the opposite end. Each journal 41 is constructed and arranged to receive the ends of two connecting rods 40 such that the connecting rods 40 are arranged in a substantially opposed configuration, which allows for the engine 16 to be more compact.

The pistons 38 reciprocate axially within the cylinders 30. The connecting rods 40 convert the axial movement of the pistons 38 into rotational movement of the crankshaft 36, and vice-versa.

Figure 3:
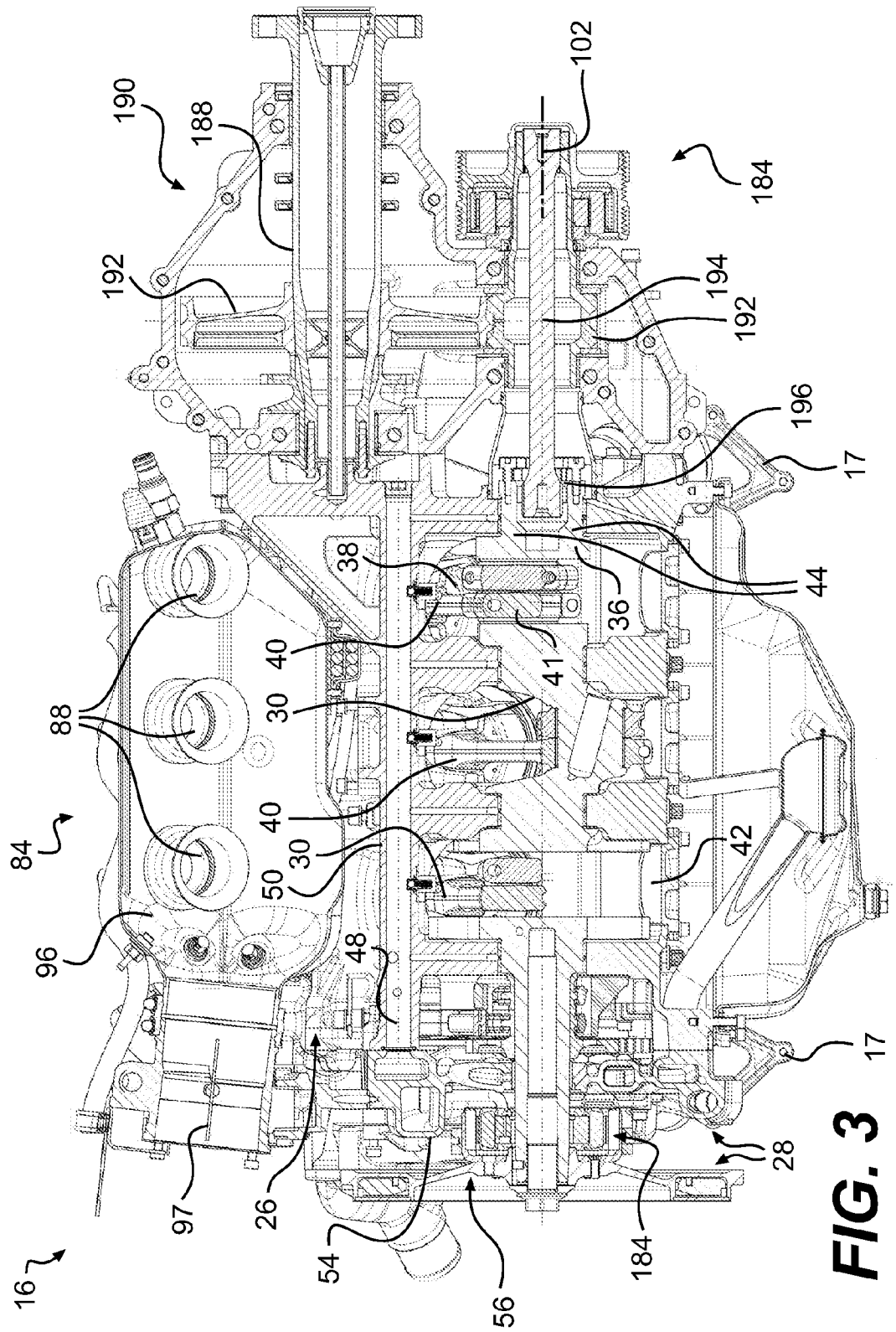
FIG. 3 is a bottom cross-sectional view, taken along a crankshaft, of the engine of the propulsion assembly of FIG. 2.

As best seen in FIG. 3, the crankcase 28 includes a crank chamber 42. It is contemplated that the crankcase 28 could include one isolated crank chamber 42 for each pair of substantially opposed cylinders 30. A bore 44 extends through the crankcase 28 and the crank chamber 42. The crankshaft 36 is received by the bore 44. The crankshaft 36 may be constructed by know methods, such as a one-piece forging. Suitable bearing assemblies are provided for smooth rotation of the crankshaft 36.

A balancing shaft 48 extends through the crankcase 28. The balancing shaft 48 is provided to counteract the moment generated by rotation of the crankshaft 36 and the piston assembly. The balancing shaft 48 and the crankshaft 36 extend through the crankcase 28 in a parallel relationship. The balancing shaft 48 is rotatably mounted within a bore 50 that extends through the crankcase 28. Suitable bearing assemblies are provided for smooth rotation of the balancing shaft 48. In one embodiment, the balancing shaft 48 is mounted in an anti-friction shell bearing. Alternatively, roller bearings may also be used. The balancing shaft 48 is operatively connected to the crankshaft 36 through a gear 54. This connection is located within a gear box 56 at one end of the crankcase 28. Cooling passageways 60 extend around the cylinders 30. The cooling passageways 60 are connected to an engine liquid cooling system (not shown).

Figure 4:
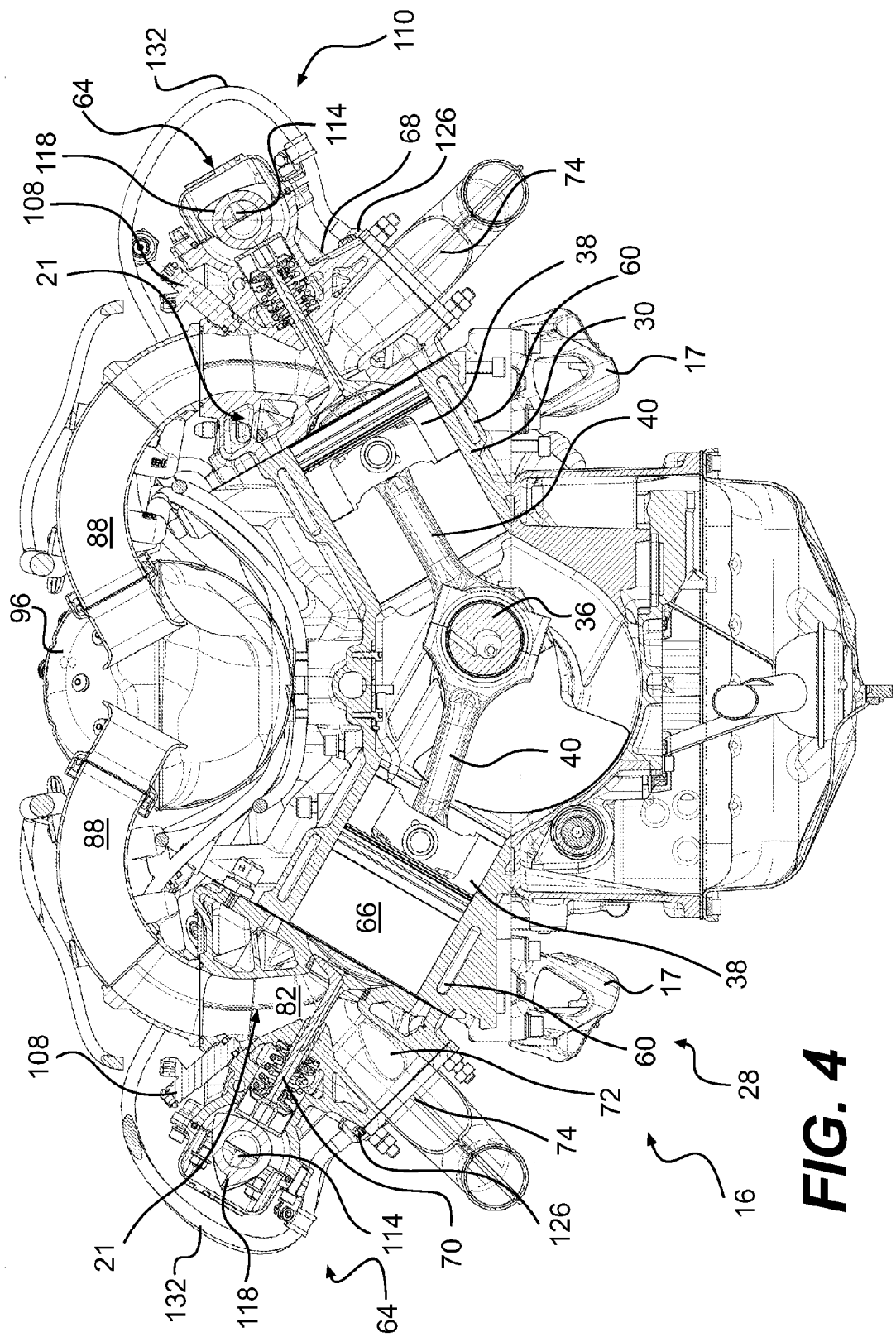
FIG. 4 is a vertical cross-sectional view taken perpendicularly through the crankshaft of the engine of FIG. 3.

As best seen in FIG. 4, two cylinder head housings 64 are secured to an upper end of the engine 16. The two cylinder head housings 64 being similar to each other only one cylinder head 64 will be described herein. Each cylinder head housing 64 is fastened to the engine casing 26. A combustion chamber 66 is provided at the top of each cylinder 30, and one intake valve 68 and one exhaust valve 70 for each cylinder 30 are mounted in the cylinder head housing 64 such that they communicate with each combustion chamber 66. The intake valves 68 are located on one side of the cylinder head housing 64 and the exhaust valves 70 are located on an opposite side of the cylinder head housing 64. It is contemplated that more than one intake valve 68 and one exhaust valve 70 may be provided for each cylinder 30.

The cylinder head housing 64 further includes at least one intake passageway 82 for each combustion chamber 66. Each intake passageway 82 extends through the cylinder head housing 64. The intake passageways 82 are operatively connected to an air intake system 84 and a fuel injection system 86. The cylinder head housing 64 further includes at least one exhaust passageway 72 for each combustion chamber 66. Each exhaust passageway 72 extends through the cylinder head housing 64. The exhaust passageways 72 are connected to an exhaust manifold 74. As shown in the figures, there is one exhaust manifold 74 disposed on each side of the engine 16. Both exhaust manifolds 74 are fluidly connected to a muffler (not shown) via suitable piping or hoses and/or a turbocharger (not shown). The turbocharger is designed to increase the pressure of the incoming air to the intake manifold 96, and hence the intake passageways 82. The muffler is disposed within a cowling 80 (shown in FIG. 2) that substantially surrounds the engine 16.

The air intake system 84 is connected to the intake passageways 82. The air intake system 84 is constructed and arranged to receive air from the environment and to deliver the air to the intake passageways 82 via an intake manifold 96 and piping 88. An air filter 89 (shown in FIG. 2) is provided to filter the air before the air enters the intake manifold 96. The intake manifold 96 is designed to distribute the intake air evenly to all of the combustions chambers 66. A throttle valve 97 is disposed within an entry of the air intake manifold 96 and is controlled by the CU 20. The throttle valve 97 is mechanically or electrically movable to increases or decrease the amount of air that enters the manifold 96 and the combustion chambers 66, and thus assists in controlling the speed of rotation of the crankshaft 36, as would be appreciated by one of ordinary skill in the art.

The fuel injection system 86 includes two common fuel rails 98 (shown in FIG. 2), one disposed on each side of the engine 16. Each fuel rail 98 extends along an upper portion of the cylinder head housing 64. Fuel is provided to the fuel rails 98 from a fuel tank (not shown) via a fuel pump (not shown). The fuel pump is integrated with the fuel tank. However, other arrangements are contemplated. The fuel enters the cowling 80 and then passes through a fuel filter (not shown). For each combustion chamber 66, one fuel injection nozzle 108 (shown in FIG. 4) extends from the fuel rail 98 into either the inlet of the intake passageway 82, or into the intake passageway 82 directly. Fuel from the injection nozzle 108 is mixed with air and the mixture enters the combustion chamber 66 through the intake valve 68. The fuel injection nozzles 108 are electromagnetically or electronically controlled via the CU 20 so that the nozzles 108 may be independently and sequentially operated. It is contemplated that each injection nozzle 108 may inject fuel directly into each combustion chamber 66.

Figure 5:
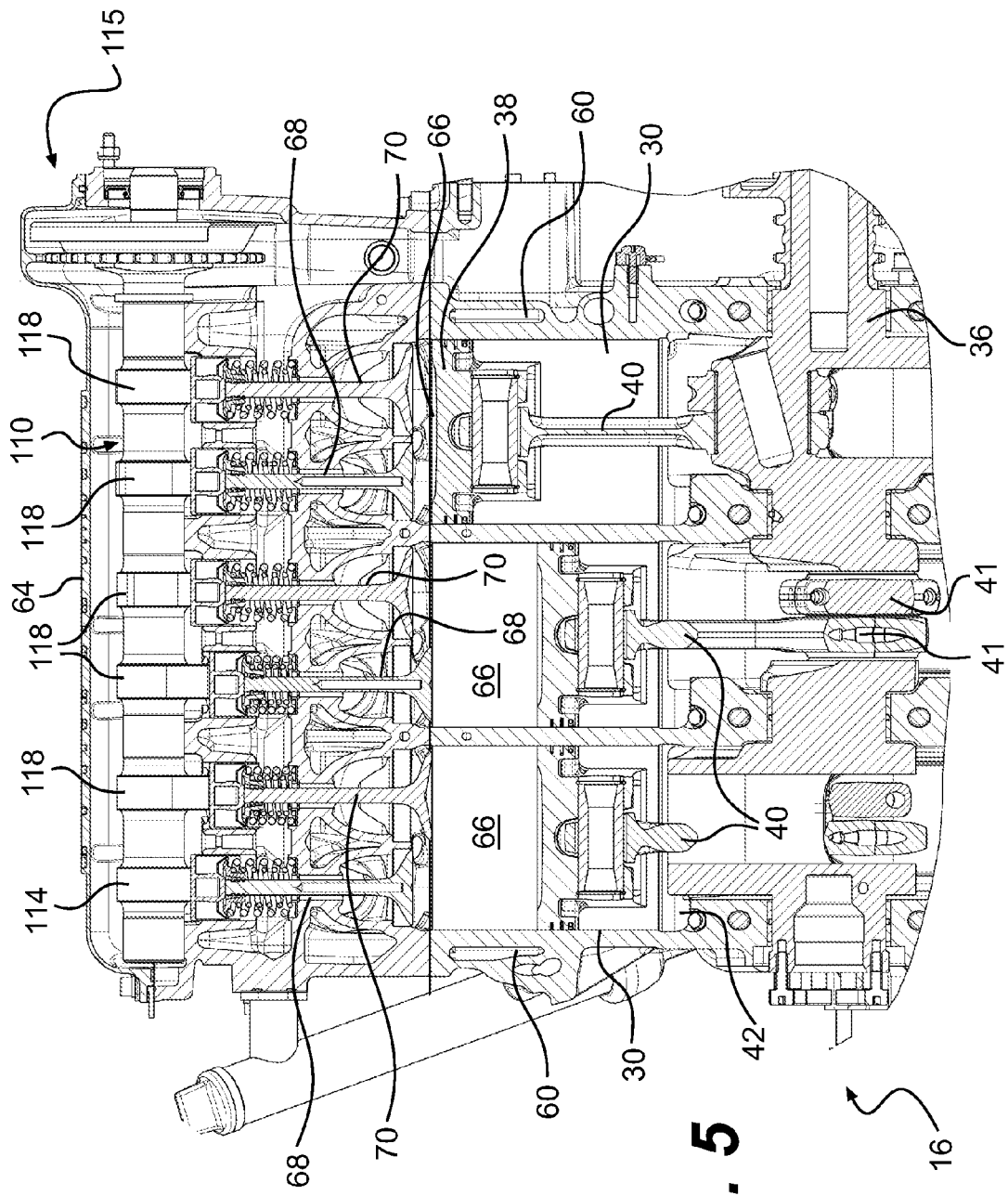
FIG. 5 is a partial cross-sectional view, taken along the crankshaft through a cylinder bank of the engine of FIG. 3.

As best seen in FIG. 5, valve operating assemblies 110 operate the intake valves 68 and the exhaust valves 70 in accordance with predetermined engine operating parameters. Each valve operating assembly 110 is located within a corresponding cylinder head housing 64 and is ultimately driven by the crankshaft 36. Belts and/or suitable gearing and chains are used to connect the crankshaft 36 to camshafts 114.

One camshaft 114 is used for each side of the engine 16 (i.e. one camshaft 114 per cylinder bank 21). It is contemplated that more than one camshaft 114 could be used for each side of the engine 16. The two camshafts 114 having a similar construction, the camshaft 114 for one side of the engine 16 will be described. Each camshaft 114 is rotatably mounted within its cylinder head housing 64 with suitable bearing assemblies. One end 115 of the camshaft 114 is connected operably to the crankshaft 36. The camshaft 114 is disposed above the intake valves 68 and exhaust valves 70 and is operatively connected to the intake and exhaust valves 68, 70 via cam lobes 118. The cam lobes 118 are provided along the camshaft 114 such that the necessary motion to operate the intake and exhaust valves 68, 70 is provided. The cam lobes 118 are oriented on the camshaft 114 to produce a predetermined timing for opening and closing the valves 68, 70 such that all of the cylinders 30 do not operate at the same time; rather, the cylinders 30 operate in a predetermined sequence. It is also contemplated that the valves 68, 70 may be operated by different types of assemblies. For example, the valves 68, 70 may be electromagnetically operated. Alternatively, the valves 68, 70 may by hydraulically operated using a slave piston/master piston arrangement.

One spark plug 126 is provided for each combustion chamber 66. It is contemplated that each combustion chamber 66 could have more than one spark plug 126. Each spark plug 126 is connected by threaded engagement to the cylinder head housing 64 such that an electrode portion of the spark plug 126 extends into the cylinder 30. The spark plug 126 is located between the intake valve 68 and the exhaust valve 70. Each spark plug 126 is connected to an electrical system 130 of the aircraft via spark plug wires 132.

A generator 184 (shown in FIG. 2) is disposed at each end of the crankshaft 36. The generators 184 are connected to the CU 20 and provide power to the CU 20 as long as the crankshaft 36 is rotating. Thus, once the engine 16 is running, the CU 20 does not require power from the battery. Therefore, the engine 16 does not require power from the battery.

The engine 16 is provided with various components which form part of the engine's electrical system 130. The electrical system 130 is initially powered by a battery (not shown). The battery provides the necessary power to a starter (not shown) to start the engine 16. The CU 20 provides power and control to components including but not limited to the fuel pumps, the fuel injection nozzle 108, the throttle valve 97, and the spark plugs 126. A plurality of sensors is disposed around the engine 16 to provide information to the CU 20. The plurality of sensors include one or more of: a throttle position sensor to sense the position of the throttle valve 97, an air temperature and pressure sensor provided in the air intake manifold 96, and an oil level sensor. In addition, an angular sensor 282 (shown schematically in FIG. 6) is provided on the crankshaft 36. With the angular sensor 282, the CU 20 can determine the angular position of the crankshaft 36, as well, the engine speed based on the frequency of the signals from the angular sensor 282 (i.e. number of crankshaft rotation completed). It is contemplated that the angular sensor 282 could be positioned so as to sense rotation of one of the camshaft 114, of the propeller shaft 188 or of the balancing shaft 28, all of which can be used to determine the angular position of the crankshaft 36 and the engine speed. The CU 20 also communicates with an acceleration sensor 290, which will be described in more detail below.

The CU 20 also receives signals from other sources disposed on the aircraft 12 in which the engine 16 is being used. For example, the CU 20 receives an ignition signal when the pilot desires to start the engine 16.

Figure 6:
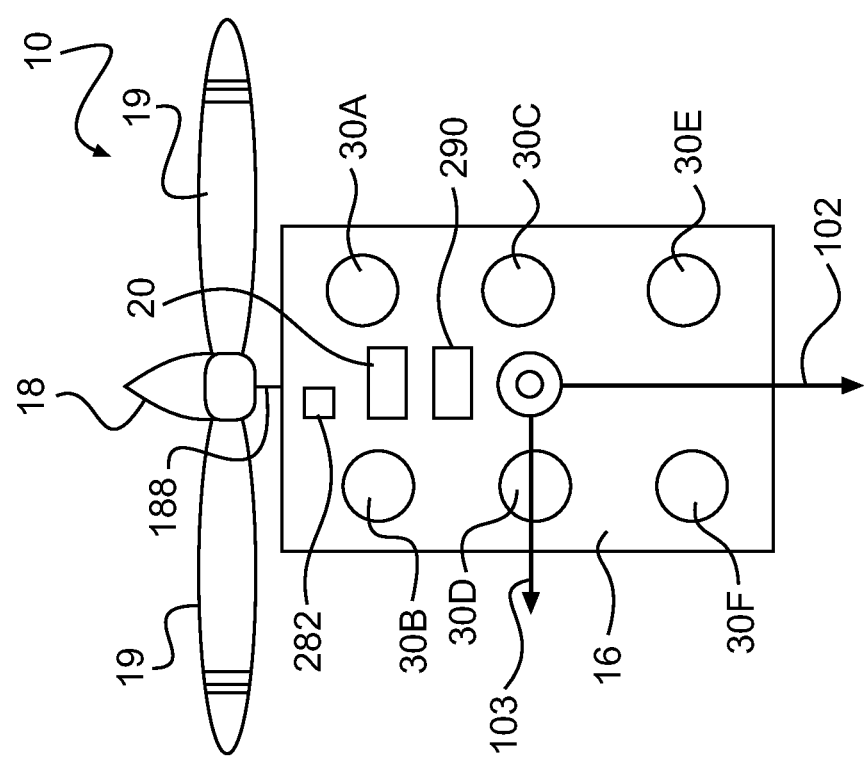
FIG. 6 is a schematic top plan view of the propulsion assembly of FIG. 2.

Turning now to FIG. 6, a firing sequence of the spark plugs 126 for each of the plurality of cylinders 30 will be described. The firing sequence described herein is only one example of a firing sequence.

The spark plugs 126 are fired one at a time during an engine cycle. Every time the crankshaft 36 rotates by 120 degrees, one of the plurality of cylinders 30 has its corresponding spark plug 126 fired. Therefore the crankshaft 36 is rotated twice (i.e. by 720 degrees) to have all six cylinders 30 fired once. Two rotations of the crankshaft 36 correspond to one engine cycle. Every time the spark plugs 126 are fired during the engine cycle, the spark plugs 12 are actually ignited twice. It is contemplated that the spark plugs 126 could be ignited only once or more than twice once during the engine cycle.

The cylinder 30E is the first cylinder 30 to be fired. As a reference point, the crankshaft 36 has an angular position of 0 degrees when the cylinder 30E is fired. Every time the angular position of the crankshaft 36 is a $4\pi$ multiple of 0 degrees (ex: 720 degrees, 1440 degrees), the cylinder 30E is fired. It is contemplated that the cylinder 30E could be fired when the crankshaft 36 has a reference position other than 0 degrees.

When the crankshaft 36 is rotated by an incremental step of 120 degrees with respect to the position it had when the first cylinder 30E was fired, the cylinder 30F is fired. As a consequence, the cylinder 30F is the second cylinder 30 to be fired. Every time the angular position of the crankshaft 36 is a $4\pi$ multiple of 120 degrees (ex: 840 degrees, 1560 degrees), the cylinder 30F is fired.

When the crankshaft 36 is rotated by an incremental step of 120 degrees with respect to the position it had when the second cylinder 30F was fired, the cylinder 30A is fired. As a consequence, the cylinder 30A is the third cylinder 30 to be fired. Every time the angular position of the crankshaft 36 is a $4\pi$ multiple of 240 degrees (ex: 960 degrees, 1680 degrees), the cylinder 30A is fired.

When the crankshaft 36 is rotated by an incremental step of 120 degrees with respect to the position it had when the third cylinder 30A was fired, the cylinder 30B is fired. As a consequence, the cylinder 30B is the fourth cylinder 30 to be fired. Every time the angular position of the crankshaft 36 is a $4\pi$ multiple of 360 degrees (ex: 1080 degrees, 1800 degrees), the cylinder 30B is fired.

When the crankshaft 36 is rotated by an incremental step of 120 degrees with respect to the position it had when the fourth cylinder 30B was fired, the cylinder 30C is fired. As a consequence, the cylinder 30C is the fifth cylinder 30 to be fired.

Every time the angular position of the crankshaft 36 is a 4π multiple of 480 degrees (ex: 1200 degrees, 1920 degrees), the cylinder 30C is fired.

When the crankshaft 36 is rotated by an incremental step of 120 degrees with respect to the position it had when the fifth cylinder 30C was fired, the cylinder 30D is fired. As a consequence, the cylinder 30D is the sixth cylinder 30 to be fired. Every time the angular position of the crankshaft 36 is a 4π multiple of 600 degrees (ex: 1320 degrees, 2040 degrees), the cylinder 30D is fired.

When the crankshaft 36 is rotated from another incremental 120 degrees with respect to the position it had when the sixth cylinder 30D was fired, the first cylinder 30E is fired again.

Turning now to FIGS. 7A to 10B, methods 300, 300' and 300" of misfire detection according to various embodiments will now be described. The methods 300, 300', 300" are applied to each engine 16 of the aircraft 12 independently, but they will be described for one of the engine 16 only. Methods 400, 400' of identification of which of the cylinders 30 has misfired will be described below with reference to FIGS. 11A to 13C.

Referring specifically to FIGS. 7A and 8 to 10B, the method 300 starts at step 302 with sensing a lateral displacement of the engine 16 using the acceleration sensor 290. The acceleration sensor 290 (shown in FIG. 6) is disposed on the engine casing 26, and records an acceleration of the engine casing 26 (and hence of the engine 16) in a direction 103 (shown in FIG. 6) which is perpendicular to the longitudinal axis 102 of the crankshaft 36. It is contemplated that the acceleration sensor 290 could be disposed so as to sense the displacement in a direction other than the direction 103, as long as the acceleration sensor 290 is disposed so as to sense the lateral displacement of the engine casing 26 in a direction skewed with respect to the longitudinal axis 102 so as to have an acceleration component perpendicular to the crankshaft 36. The acceleration sensor 290 is connected to the CU 20 and transmits the recorded acceleration to the CU 20 in real time. The CU 20 includes a memory which stores one or more of historical values of the recorded displacement, maps, predetermined values, depending on the data needed by the CU 20 for the processing. It is contemplated that the acceleration sensor 290 could be disposed elsewhere on the engine 16. For example, the acceleration sensor 290 could be disposed on the crankcase 28 or on the gear box 190. It is contemplated that the acceleration sensor 290 could be connected indirectly to the engine 16 via an intermediate member. For example the intermediate member could be a rigid rod fixed to the engine casing 26. It is also contemplated that the acceleration sensor 290 could sense the displacement of the engine 16 in more than one direction. It is also contemplated that the engine 16 could have more than one acceleration sensor. In such case, it is contemplated that the acceleration sensors could have different sensitivities. It is contemplated that the acceleration sensor 290 could communicate with the CU 20 with a time lag. Is it also contemplated that the CU 20 could be connected to a data storage unit that would be separate from the CU 20.

At step 304, the CU 20 processes the recorded displacement of the engine 16 in order to determine if one (or more) of the cylinders 30 has misfired. Determination of misfire is done by calculating a magnitude of a predetermined frequency of the engine 16 that is representative of in-cylinder pressures.

As the combustion takes places in the cylinders 30, the in-cylinder pressures create a torque component onto the crankshaft 36, which in turn provokes the engine 16's displacement. The engine 16's displacement can be decomposed into a plurality of frequencies. The processing is a spectral analysis, in which the plurality of frequencies and their associated magnitudes are extracted from the temporal signature of the displacement of the engine 16. The spectral analysis described herein uses a Fourier decomposition basis and associated Fourier coefficients. The Fourier decomposition basis includes a plurality of Fourier basis functions. The Fourier coefficients associated with each of the Fourier basis functions are the associated magnitudes. Each Fourier basis function has an associated unique frequency (one to one relationship), and each frequency corresponds to an order (or oscillation mode) of the engine 16 (one to one relationship). The spectral analysis provides also phase angles associated with each of the Fourier basis function. Although the phase angles are not needed with the method 300 for determining misfire, the phase angles can be used by the method 400' described below to determine which one of the cylinders 30 has misfired. A method to achieve the Fourier decomposition being a well known decomposition, it will not be described in detail herein.

The Fourier basis and the associated orders for the engine 16 described herein will now be described for the engine 16 running at an engine speed of 5000 rpm, as an example. It is should be understood that the Fourier basis would be different for a different engine, as well as for the same engine 16 but running at an engine speed different from 5000 rpm. Assuming an engine speed of 5000 revolutions per minutes (or 83.3 revolutions per seconds), the engine 16 has a base frequency of 83.3 Hz. The engine base frequency is considered to be associated with the $1^{st}$ order (or $1^{st}$ mode of oscillation). All the other orders are associated with integer multiples of the base frequency. For example, the $2^{nd}$ order is associated with a frequency of 2*83.3 Hz=166.6 Hz, $3^{rd}$ order is associated with a frequency of 3*83.3 Hz=250 Hz, etc. In addition, since an engine cycle for the engine 16 described herein is accomplished for two full crankshaft rotations (720 degrees or 4π), and not a single crankshaft rotation of 360 degrees, the displacement of the engine 16 is additionally decomposed on an half order basis. The half order basis is composed of the orders $0.5^{th}$, $1.5^{th}$, $2.5^{th}$, etc. The $0.5^{th}$ order is the lowest order and is associated with a frequency of ½*83.3 Hz=41.6 Hz. All the other half orders are associated with frequencies that are multiple odd integers of the frequency of the $0.5^{th}$ order. For example, the $1.5^{th}$ order is associated with a frequency of 3*41.6 Hz=125 Hz, the $2.5^{th}$ order is associated with a frequency of 5*41.6 Hz=208.33 Hz, etc. Thus, when the half orders and the integers orders are combined for the Fourier decomposition, all the frequencies associated with the frequencies are found by multiplying the order with the engine base frequency: $0.5^{th}$ order associated with a frequency of 0.5*83.3 Hz (=41.6 Hz), $1^{st}$ order associated with a frequency of 1*83.3 Hz (=83.3 Hz), $1.5^{th}$ order associated with a frequency of 1.5*83.3 Hz (=125 Hz), etc.

Among the frequencies composing the displacement of the engine 16, one frequency is best representative of the in-cylinder pressures. This frequency is the predetermined frequency (or associated predetermined order) for the method 300. The frequency being the best representative of in-cylinder pressures is of particular interest because the pressure in each of the cylinders 30 is strongly modified when the corresponding cylinder 30 misfires. Thus, by monitoring the magnitude of the frequency being the best representative of in-cylinder pressures one can determine if one (or more) of the cylinders 30 has misfired. It is contemplated that, depending on the engine 16, there could be more than one frequency representative of the in-cylinder pressures. In such case, the frequency that has the greatest associated magnitude would preferably be chosen as the predetermined frequency.

A bench test is performed prior to using the engine 16 in flight to determine which of the frequencies is the predetermined frequency. The bench test consists in starting the engine 16, and after a certain number of engine cycles, turning one of the spark plugs 126 off to simulate misfire. When one of the spark plugs 126 is turned off, a component of the torque applied to the crankshaft 36 is missing, which creates an unbalanced torque distribution on the crankshaft 36. This abnormal torque results in an abnormal engine displacement, which is characterised by an abnormal magnitude of one of the orders. The one of the order is the order associated with the predetermined frequency.

Figure 9A:
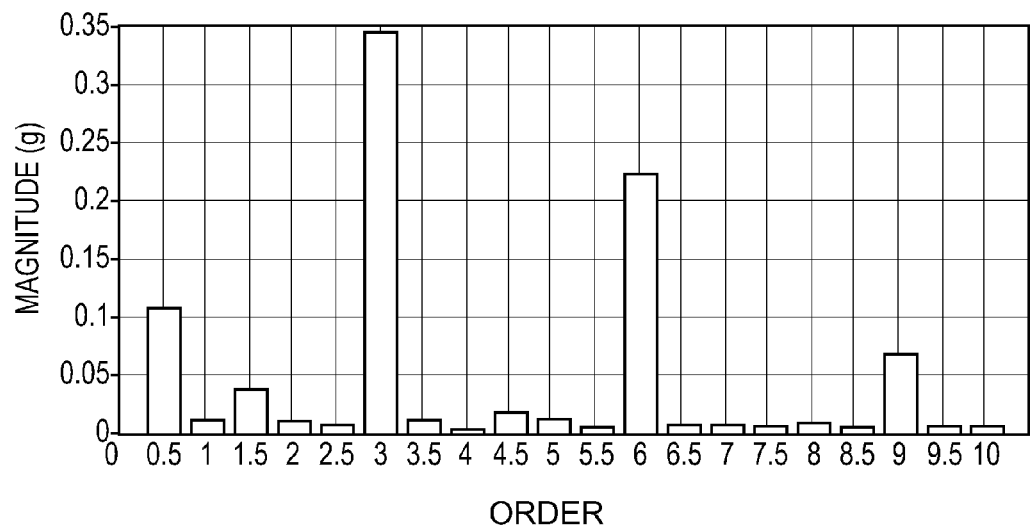
FIG. 9A is a graph illustrating magnitudes of different orders of oscillation of the engine of FIG. 3 in a normal operating condition.
Figure 9B:
FIG. 9B is a graph illustrating magnitudes of different orders of oscillation of the engine of FIG. 3 in an abnormal operating condition resulting from one cylinder of the engine having misfired.

A spectral analysis as described above, done before and after misfire allows to identify which order has a dominant magnitude after the misfire. FIGS. 9A and 9B show magnitudes of the orders from 0.5 to 10 in case of a normal operation condition (FIG. 9A), and in case of one of the cylinders 30 misfires (FIG. 9B). Orders beyond the $10^{th}$ order are generally of lesser magnitude than the lowest orders, and have not been represented in the graphs of FIGS. 9A and 9B. As can be noticed, in case of misfire, the $0.5^{th}$ order has the highest magnitude compared to the other orders. As a consequence, for the engine 16 described herein, the order best representative of in-cylinder pressures is the $0.5^{th}$ order, and the predetermined frequency is the frequency associated with the $0.5^{th}$ order (here for the engine speed of 5000 rpm: 41.6 Hz). It is contemplated that for an engine different than the one described herein, an order other than the $0.5^{th}$ order could be the order best representative of in-cylinder pressures.

Figure 8:
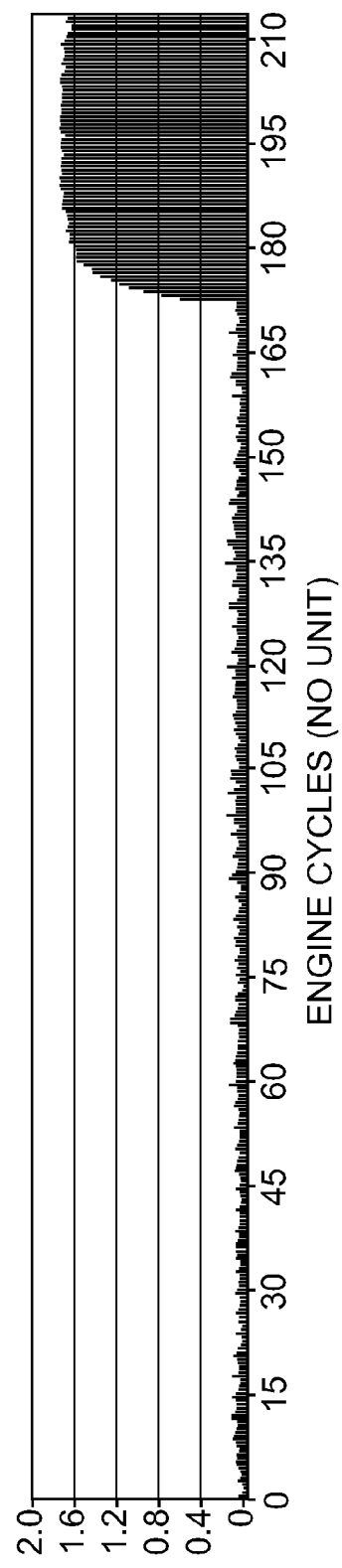
FIG. 8 is a graph illustrating a magnitude of a $0.5^{th}$ order of oscillation of the engine versus engine cycles, for the engine of FIG. 3, with one of the cylinders being switched off starting at engine cycle 175.

At step 306, the CU 280 is programmed to perform the spectral analysis on the temporal signature of the lateral displacement of the engine 16, as described above, and to extract the magnitude (i.e. Fourier coefficient) associated with the $0.5^{th}$ order. Once the CU 20 determines in real time the magnitude of the $0.5^{th}$ order, one option, performed at step 308, to determine if there has been misfire, is to compare the magnitude of the $0.5^{th}$ order with historical values of the magnitude of the $0.5^{th}$ order. As shown in FIG. 8, when the cylinder 30C is being turned off (i.e. the corresponding spark plug 126 is turned off) after 175 engines cycles, the magnitude of the $0.5^{th}$ order jumps from below 0.2 g to above 1.6 g (i.e. about 8 times). As the CU 20 records in time the magnitude of the $0.5^{th}$ order, the CU 20 also compares the instantaneous value of the magnitude of the $0.5^{th}$ order with previous values. By instantaneous, one should understand the value obtained from the spectral analysis of a full cycle of the engine 16 (corresponding to two revolutions of the crankshaft 36). Once the instantaneous value exceeds the previous values by a predetermined amount (for example by an amount of at least 0.8 g for the case illustrated in FIG. 8), it is determined that misfire has occurred. It is contemplated that instead of comparing instantaneous values of the magnitude of the $0.5^{th}$ order, the CU 20 could compare instantaneous increases of the magnitude of the $0.5^{th}$ order.

Another option, performed alternatively at step 310, uses the instantaneous value magnitude of the $0.5^{th}$ order to compare it with a predetermined value of the magnitude that is representative of a normal operating condition (i.e. no misfire). For the case illustrated in FIG. 8, and considering only the engine cycles from 90 cycles to 150 cycles are being performed during a bench test prior to using the engine 16 in-flight, the predetermined value representative of a normal operating condition is a magnitude of below 0.4 g. It is contemplated that instead of comparing instantaneous values of the magnitude of the $0.5^{th}$ order, the CU 20 could compare instantaneous increases of the magnitude of the $0.5^{th}$ order with a predetermined increase that is representative of a normal operating condition. It is also contemplated that the instantaneous value of the magnitude of the $0.5^{th}$ order could be compared with a predetermined value of the magnitude that is representative of an abnormal operating condition (i.e. misfire). It is also contemplated that the magnitude of the $0.5^{th}$ order could be used to determine a health condition and compare it with a predetermined health condition of the engine. In one example, the health condition is a value between 0 and 1. The value 0 is attributed to a non healthy engine which has at least one cylinder 30 not firing. The value 1 is attributed to a healthy engine which fires all the spark plugs 126 properly in the predetermined sequence and timing. The health condition could be based additionally on the temporal signature of the displacement of the engine 16 and/or on a series of rules.

Figure 10A:
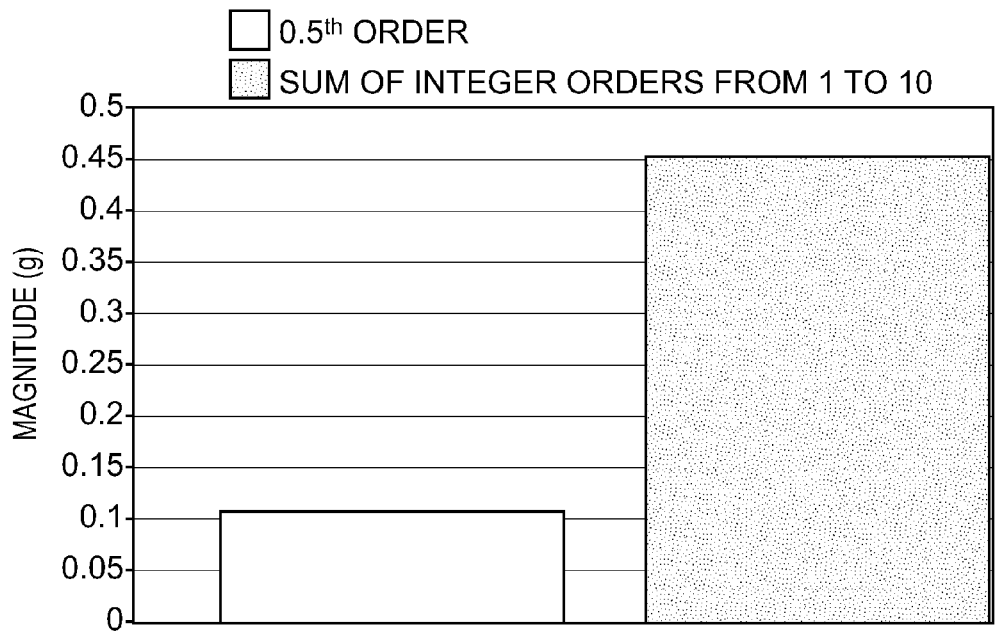
FIG. 10A illustrates a magnitude of the $0.5^{th}$ order of oscillation (left column) and a cumulated magnitude of the integer orders of oscillation 1 to 10 (right column) in the normal operating condition.
Figure 10B:
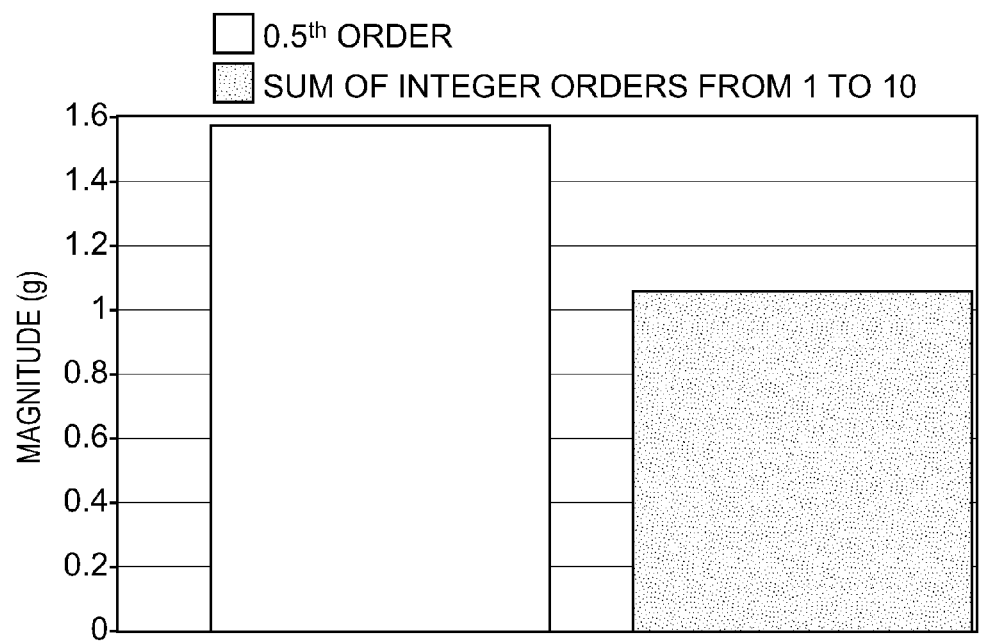
FIG. 10B illustrates a magnitude of the $0.5^{th}$ order of oscillation (left column) and a cumulated magnitude of the integer orders of oscillation 1 to 10 (right column) in the abnormal operating condition.

Another way to determine if there has been misfire, performed alternatively at step 312, uses the instantaneous value of the magnitude of the $0.5^{th}$ order to compare it with a cumulated (i.e. added) magnitude of the first ten most significant integers orders. The cumulated magnitudes of the integer orders between 1 and 10 compared to the magnitude of the $0.5^{th}$ order are shown in FIG. 10A a normal operating condition and FIG. 10B for an abnormal operating condition (i.e. after turning off the spark plug 126). The CU 20 as the engine 16 runs, performs in real time the spectral analysis, extracts the magnitude of the $0.5^{th}$ order and of the integer orders 1 to 10, adds the magnitudes of integer orders 1 to 10 and compares it to the magnitude of the $0.5^{th}$ order. When the magnitude of the $0.5^{th}$ order is greater than the cumulated magnitude, the CU 20 concludes that misfire has been detected. Since, as shown in FIG. 9B, the magnitudes generally decrease for higher order in case of misfire, only a discrete number of integers orders are necessary to obtain the cumulated magnitude (here the first ten integer orders). However, more or less than the first ten most significant integers orders could be used. The number of orders required for performing step 312 is determined during a bench test, where one of the spark plugs 126 is turned off to simulate misfire. A spectral analysis is performed before and after turning the spark plug 126 off. The magnitudes of different orders are being added until a combination of order is found that exhibits a cumulated magnitude higher than the magnitude of the $0.5^{th}$ order in the normal operating condition, and a cumulated magnitude lower than the magnitude of the $0.5^{th}$ order in the abnormal operating condition. It is contemplated that the sum could include some half orders besides the $0.5^{th}$ order, depending on the results of the bench tests for the engine tested. Although the sum is being performed for the integer orders, it is contemplated that the sum could include only half orders and no integer orders, depending on the results of the bench tests for the engine tested.

Figure 7A:
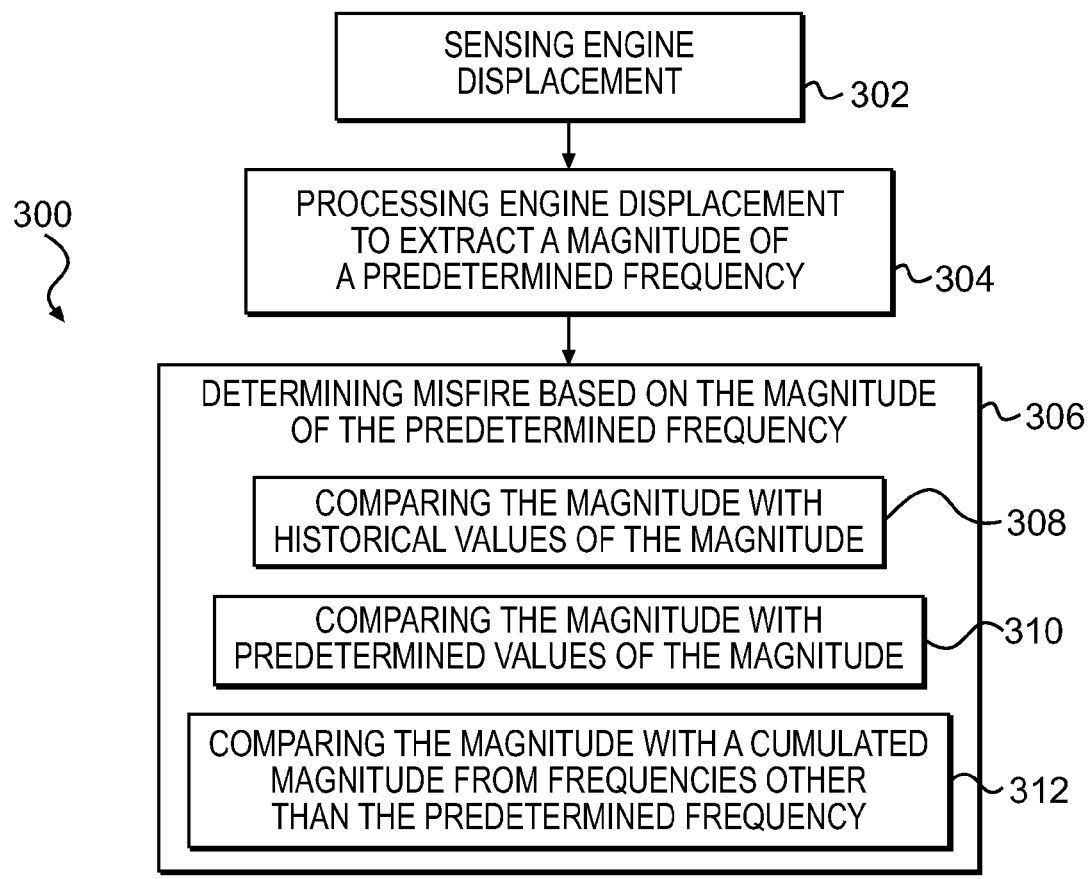
FIG. 7A is a flow chart of a first embodiment of a method of detecting misfire for the engine of FIG. 3.
Figure 7B:
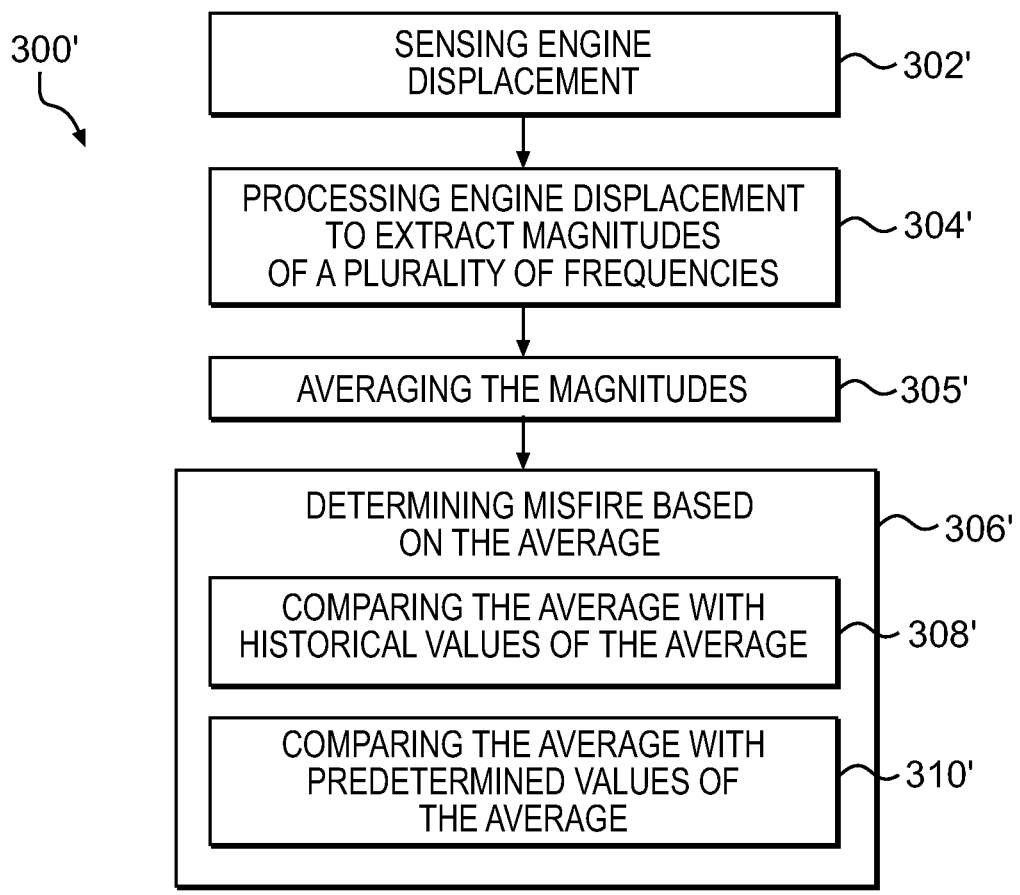
FIG. 7B is a flow chart of a second embodiment of the method of detecting misfire for the engine of FIG. 3.

Referring now to FIG. 7B, the method 300' alternative to the method 300 starts at step 302' with sensing a lateral displacement of the engine 16. The step 302' is similar to the step 302 and will not be described herein again.

At step 304', the CU 20 processes the engine lateral displacement temporal signature to extract the magnitudes of all the frequencies composing the engine lateral displacement. The CU 20 performs the same spectral analysis as the one described at step 304, but instead of extracting only the magnitude of the predetermined frequency, the CU 20 extracts the magnitudes of all the frequencies without identifying the predetermined frequency. It is contemplated that the CU 20 could process the engine lateral displacement so as to extract the magnitudes of only a predetermined discrete number of frequencies or of a frequency band.

At step 305', the CU 20 averages the magnitudes of the frequencies extracted to obtain an averaged magnitude. It is contemplated that step 305' could be solely adding the magnitudes of the frequencies to obtain an added magnitude.

At step 306', the CU 20 determines if misfire has occurred based on the value of the averaged magnitude. There are at least two ways to determine misfire based on the value of the averaged magnitude. At step 308', the CU 20 compares the averaged magnitude with historical values of the averaged magnitude. The CU 20 is programmed to compute the averaged magnitude in real time as the engine 16 runs and to store the values for later usage. If the averaged magnitude increases of a predetermined amount compared to the historical values (for a same engine speed), the CU 20 determines that there is misfire in at least one of the cylinders 30. Alternatively, at step 310', the CU 20 compares the averaged magnitude with a predetermined averaged magnitude for a corresponding engine speed. The predetermined averaged magnitude is obtained during bench tests and corresponds to the averaged magnitude for the engine 16 in the normal operating condition. If the averaged magnitude is greater than the predetermined averaged magnitude, the CU 20 determines that there is misfire in at least one of the cylinders 30. It is contemplated that the predetermined averaged magnitude could be for the engine 16 in an abnormal operating condition. It is contemplated that instead of comparing instantaneous values of the averaged magnitude, the CU 20 could compare instantaneous increases of the averaged magnitude.

Figure 7C:
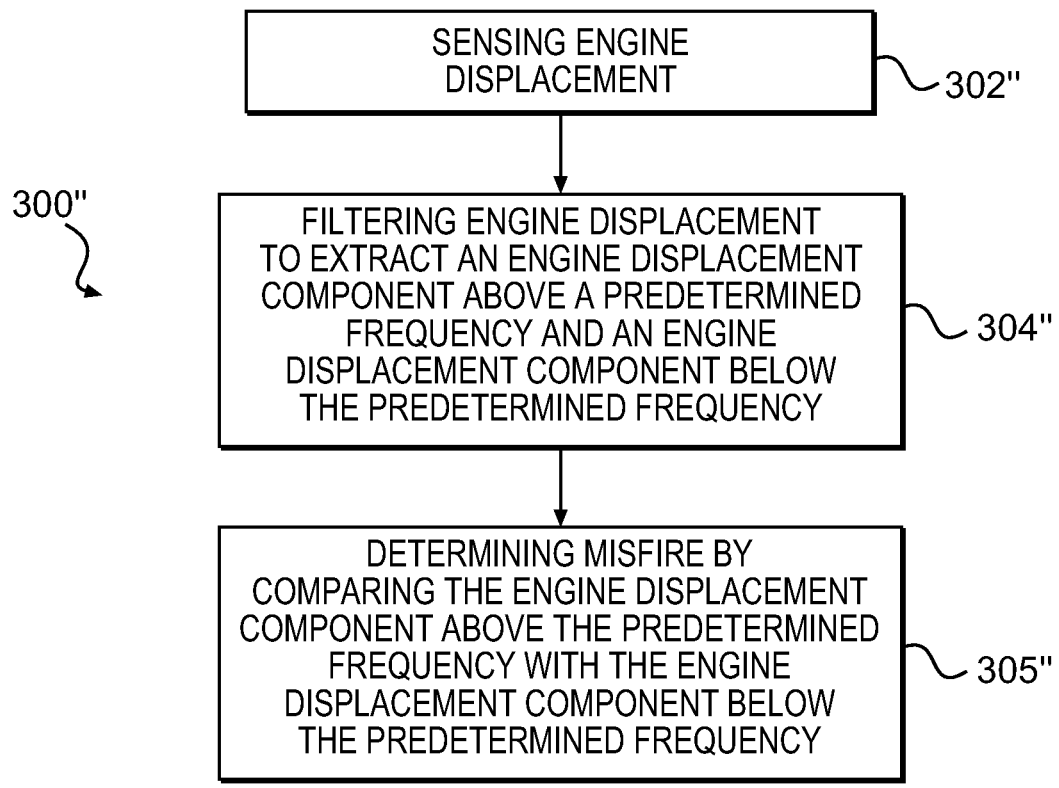
FIG. 7C is a flow chart of a third embodiment of the method of detecting misfire for the engine of FIG. 3.

Referring now to FIG. 7C, the method 300" alternative to the methods 300 and 300' starts at step 302" with sensing a lateral displacement of the engine 16. The step 302" is similar to the step 302 and will not be described herein again.

At step 304", the CU 20 filters the engine displacement temporal signature to extract an engine displacement component above a predetermined frequency and an engine component below the predetermined frequency. The CU 20 on one hand applies a low pass filter to separate the engine displacement component related to low frequencies and on the other hand applies a high pass filter to separate the high frequency components of the engine displacement temporal signature. Both the low pass filter and the high pass filter are of the type with variable cut-off frequency. The CU 20 controls the cut-off frequencies according to the engine speed so that the cut-off frequencies of the low pass filter and the high pass filter are both above yet close to the frequency associated with $0.5^{th}$ order. The low frequencies include the frequency associated with the $0.5^{th}$ order for the same reasons as exposed above for the method 300. It is contemplated that the low frequencies could include only the frequency associated with the $0.5^{th}$ order. It is contemplated that the CU 20 could apply a band pass filter instead of a high pass filter to extract engine displacement component related to higher frequencies.

At step 305", the CU 20 compares the engine displacement component obtained from the low pass filter from the engine displacement component obtained from the high pass filter. The CU 20 adds on one hand the signals obtained from the low pass filter over an engine cycle, and on the other hand the signals obtained from the high pass filter over an engine cycle. If the sum of the signals obtained from the low pass filter is greater than the sum of the signals obtained from the high pass filter, the CU 20 determines that at least one of the cylinders 30 has misfired.

Turning now to FIG. 11A to FIG. 13C, the methods 400 and 400' of identification of which of the cylinders 30 has misfired will be described below. The methods 400, 400' described below can be performed as optional additional steps to each of the methods 300, 300', 300". In such case, some of the steps already contained in the method 300, 300', 300" such as 'sensing engine displacement' may not be repeated.

Figure 11A:
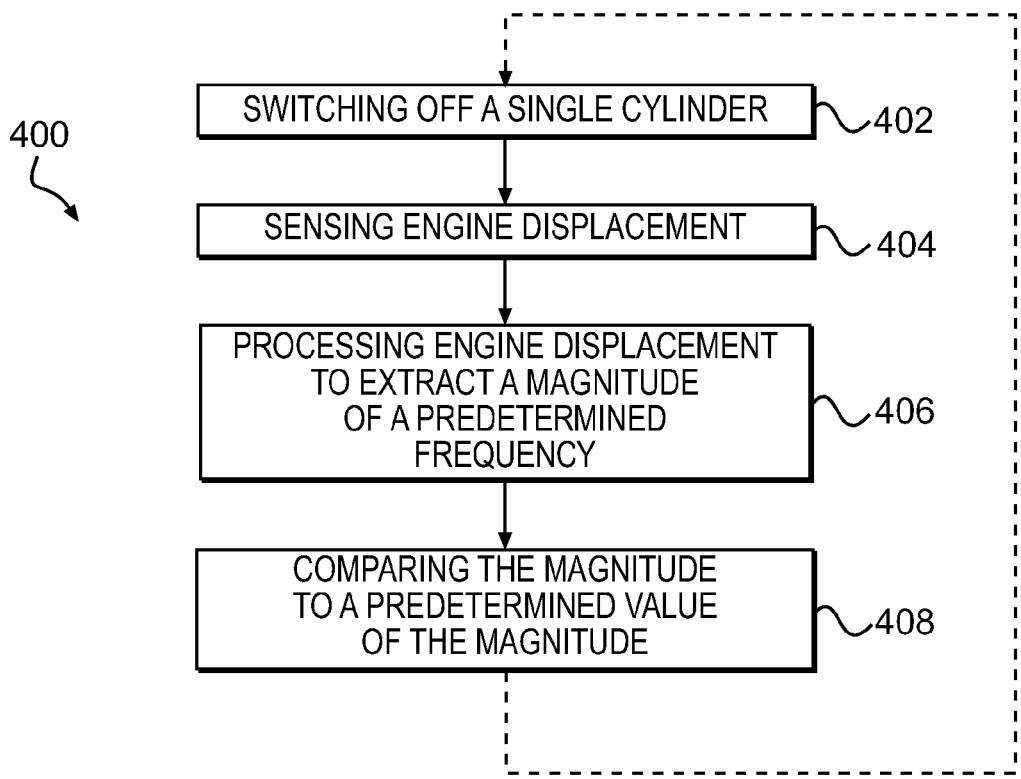
FIG. 11A is a flow chart of a first embodiment of a method of determining which cylinder of the engine of FIG. 3 has misfired.
Figure 11B:
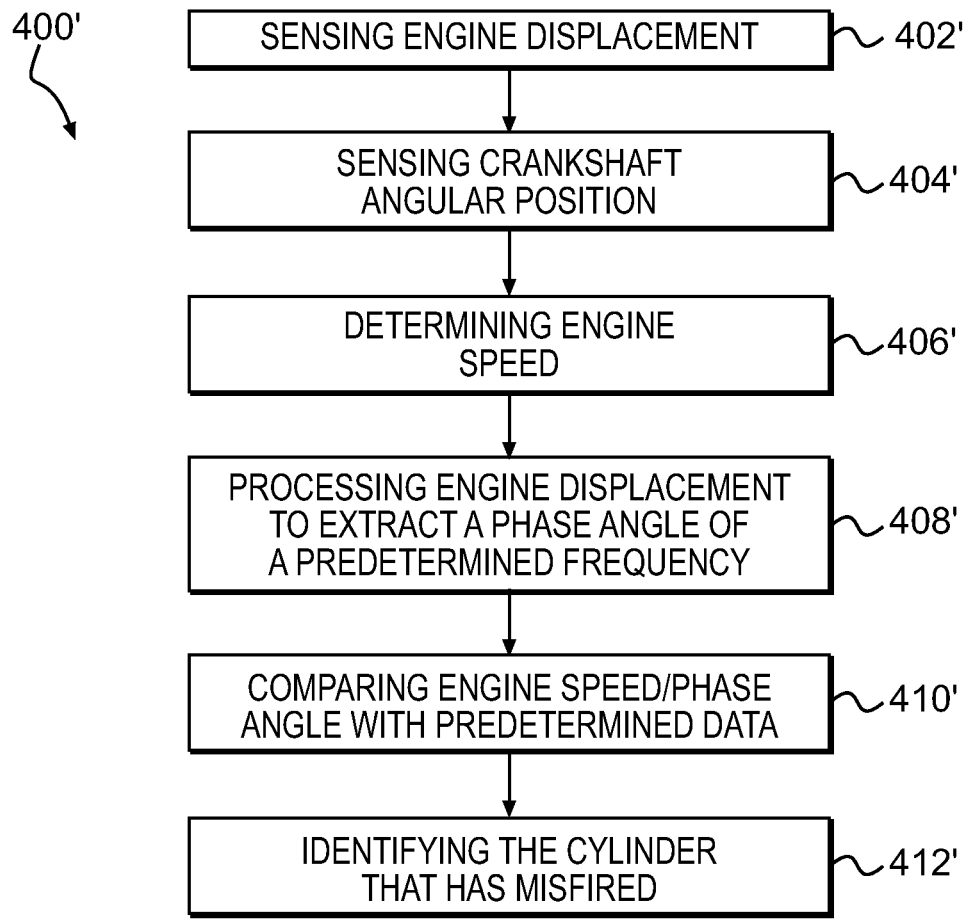
FIG. 11B is a flow chart of a second embodiment of the method of determining which cylinder of the engine of FIG. 3 has misfired.

Referring specifically to FIG. 11A, the method 400 selectively switches off one of the cylinders 30 and compares the magnitude of the $0.5^{th}$ order to determine which of the cylinders 30 is the misfired cylinder.

At step 402, the CU 20 commands the spark plug 126 of one of the cylinders 30 to not fire for a few engine cycles. At step 404, the acceleration sensor 290 records the engine lateral displacement. At step 406, the CU 20 processes the engine lateral displacement to extract the magnitude of the $0.5^{th}$ order, as described above for the step 304. At step 408, the CU 20 compares the magnitude of the $0.5^{th}$ order with a predetermined value of the magnitude of the $0.5^{th}$ order. The predetermined value corresponds to the value of the magnitude of the $0.5^{th}$ order when two opposite cylinders 30 are switched off. By opposite, one should understand the cylinder 30 normally firing at a crankshaft's angle 360 degrees from the cylinder 30 under consideration. For the engine 16 described herein, the cylinders 30E and 30B, 30F and 30C, and 30A and 30D form opposite pairs of cylinders 30. For an even number of cylinders 30, when two opposite cylinders 30 are being switched off, the lack of torques produce balance each other, and the magnitude of the $0.5^{th}$ order is lower than when only one of the opposite cylinders 30 is being switched off. Thus, if at step 408, the magnitude of the $0.5^{th}$ order is about the predetermined value, the CU 20 concludes that the cylinders 30 that has misfired is the cylinder opposite to the one that has been switched off at step 402. If at step 408, the magnitude of the $0.5^{th}$ order is not the predetermined value, the CU 20 return to step 402 to command the spark plug 126 of the cylinder 30 switched off to be actuated again, and commands another one of the cylinders 30 to be switched off. The method 400 proceeds with steps 404, 406 and 408 until determining which cylinder 30 is the misfired cylinder. It is contemplated that the step 408 could be replaced by a step where the magnitude of the $0.5^{th}$ order is compared to historical values of the magnitude of the $0.5^{th}$ order. It is also contemplated that the step 408 could be replaced by checking if the magnitude of the $0.5^{th}$ order decreases.

Referring specifically to FIGS. 11B and 13A to 13C, an alternative method 400' for determining which one of the cylinders 30 is the misfired cylinder will now be described.

Figure 12:
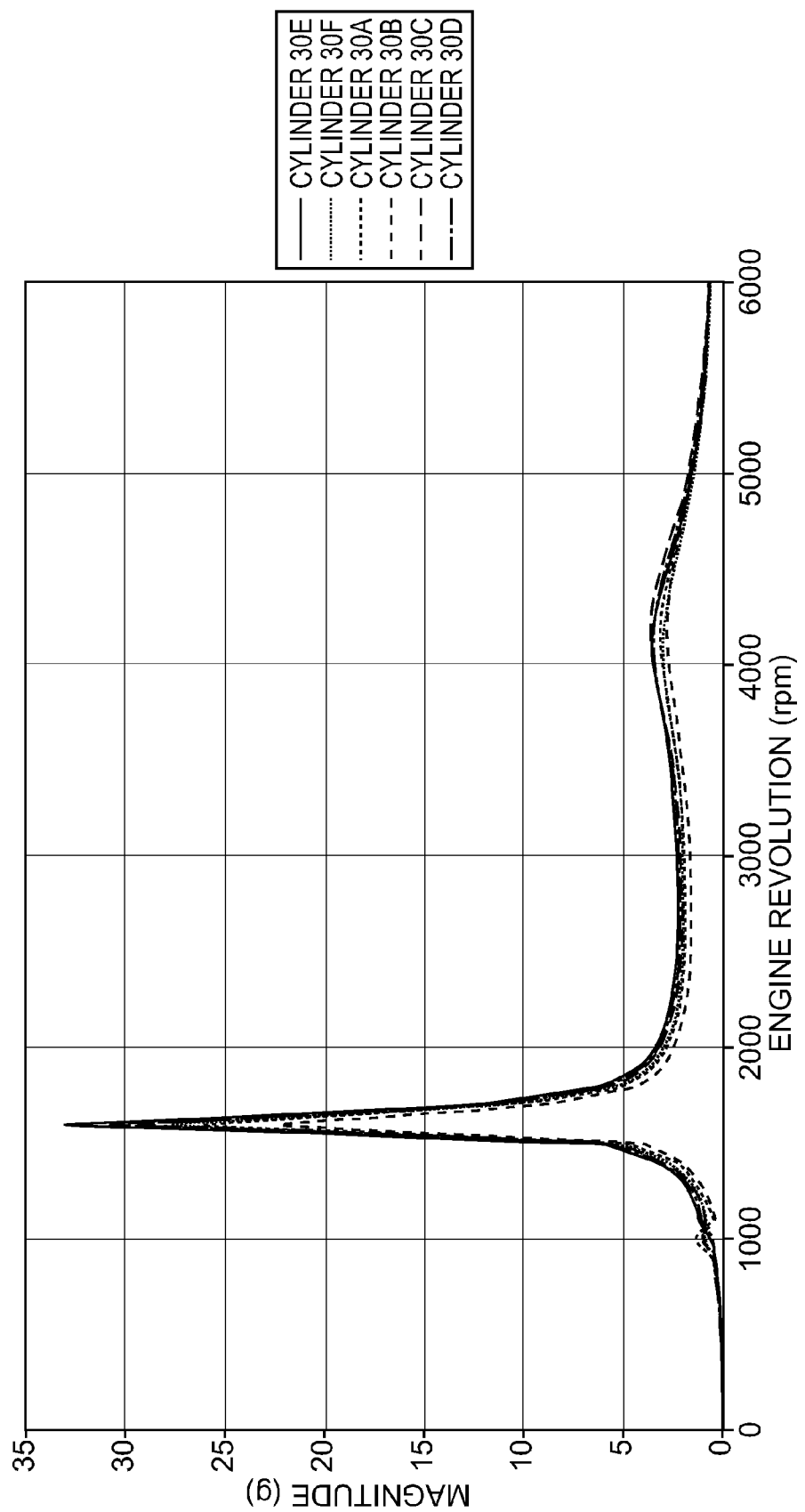
FIG. 12 illustrates a magnitude of the $0.5^{th}$ order of oscillation for different cylinders of the engine of FIG. 3.

As can be seen in FIG. 12, the magnitude of the $0.5^{th}$ order is indistinct of the cylinders 30. The method 400' thus uses the phase angle of the $0.5^{th}$ order for different typical misfire scenarios to determine which of the cylinders 30 has misfired. Each of the typical misfire scenario corresponds to the engine 16 having a distinct one of the plurality of cylinders 30 misfiring. The method 400' is based on the fact that when the phase angle of the $0.5^{th}$ order versus engine speed is known for each of the above misfire scenarios, it is possible to identify a unique cylinder 30 as the misfired cylinder.

Figure 13A:
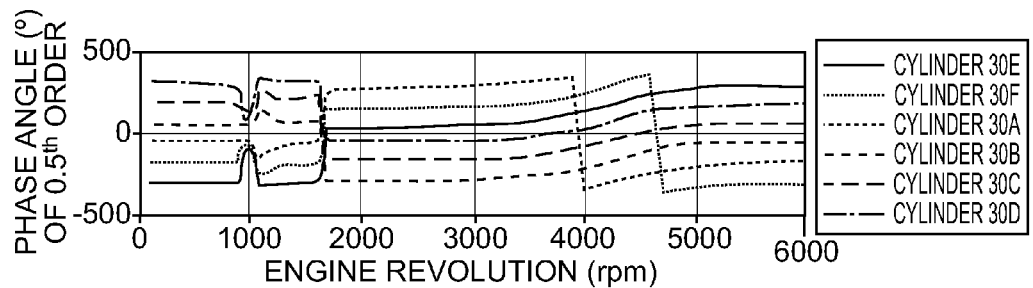
FIG. 13A illustrates the phase angle of the $0.5^{th}$ order of oscillation for different engine speeds and for the different cylinders of the engine of FIG. 3.

At step 402', if not previously done for any of the methods 300, 300', and 300", the acceleration sensor 290 senses the engine lateral displacement. At step 404', the angular sensor 282 senses an angular position of the crankshaft 36. The steps 402' and 404' can be performed simultaneously or one after the other in any order. At step 406', the CU 20 determines an engine speed based on the information collected by the angular sensor 282. It is contemplated that a sensor distinct from the angular sensor 282 could be used to determine the engine speed. At step 408', the CU 20 processes the engine lateral displacement to extract the phase angle of the $0.5^{th}$ order. The phase angle of the $0.5^{th}$ order is the phase portion of the Fourier basis function associated with the $0.5^{th}$ order. During the spectral analysis, the phase angle is sampled over a $4\pi$ window which is determined using the angular position of the crankshaft 36 provided by the angular sensor 282 at step 404'. At step 410', the CU 20 compares the phase angle of the $0.5^{th}$ order/engine speed pair with predetermined data. The predetermined data include the phase angle of the $0.5^{th}$ order/engine speed pair for each of the scenarios where one of the cylinders 30 is being switched off. The predetermined data is illustrated in FIG. 13A. The predetermined data is obtained during a bench test and stored so as to be accessible by the CU 20 when the method 400' is performed.

Figure 13B:
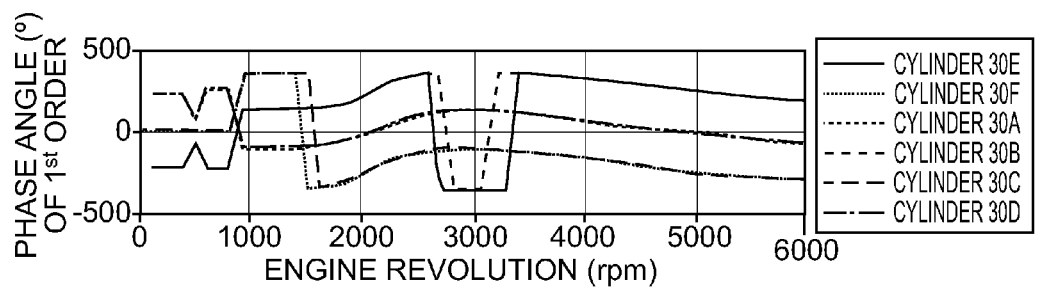
FIG. 13B illustrates the phase angle of the $1^{st}$ order of oscillation for different engine speeds and for the different cylinders of the engine of FIG. 3.
Figure 13C:
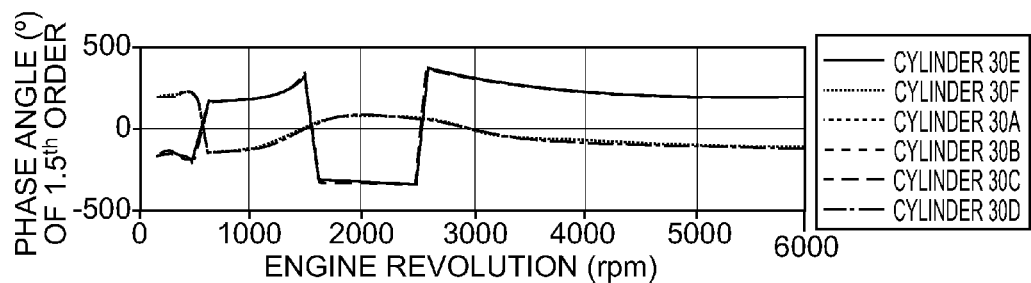
FIG. 13C illustrates the phase angle of the $1.5^{th}$ order of oscillation for different engine speeds and for the different cylinders of the engine of FIG. 3.

The $0.5^{th}$ order is the order chosen for the method 400' because it has distinct phase angle versus engine speed values for each of the cylinders 30. FIGS. 13A to 13C illustrate the phase angles variation with engine speed, for each cylinder 30, for three representative orders (respectively $0.5^{th}$, $1^{st}$, $1.5^{th}$ orders). As can be noticed, for the $1^{st}$ and $1.5^{th}$ orders, the phase angle variations with engine speeds are indistinct for some of the cylinders 30, while the graph of the $0.5^{th}$ order allows for each phase angle/engine speed pair to associate a unique cylinder 30 for engine speeds above idle (i.e. above about 1750 rpm). However, it is contemplated that, depending on the engine 16, an order other than the $0.5^{th}$ order could be the order that allows for each phase angle/engine speed pair to associate a unique cylinder 30. It is also contemplated that, depending on the engine 16, more than one order could allow for each phase angle/engine speed pair to associate a unique cylinder 30. In such case, one would select, among these orders, the order with the greatest magnitude.

At step 412', the CU 20 determines which scenario corresponds to the phase angle of the $0.5^{th}$ order/engine speed pair recorded. The cylinder 30 that has misfired is the cylinder 30 which was turned off during the scenario identified.

It should be understood that some or all of the bench tests described above could be replaced by mathematical modeling of the engine 16 or a combination of bench tests and mathematical modeling.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A method of detecting misfire in an internal combustion engine, the engine having a plurality of cylinders, a corresponding plurality of pistons, and a shaft operatively connected to the plurality of pistons, the shaft having a longitudinal axis about which the shaft rotates, the method comprising:
   sensing a temporal signature of a lateral displacement of the engine via an acceleration sensor, the acceleration sensor sensing the lateral displacement in at least one direction, the at least one direction being non-parallel relative to the longitudinal axis of the shaft, the acceleration sensor being connected to a control unit, the temporal signature being decomposable into a plurality of frequencies, associated magnitudes, and associated phase angles, each of the plurality of frequencies being associated with a corresponding one of a plurality of orders of the engine;
   sending a signal corresponding to the temporal signature of the lateral displacement from the acceleration sensor to the control unit;
   processing the signal with the control unit, the processing comprising:
   performing a spectral analysis of the temporal signature of the lateral displacement to extract a magnitude of a predetermined frequency, the predetermined frequency being associated with one of the plurality of orders of the engine, the one of the plurality of orders being representative of engine displacement due to in-cylinder pressures; and
   determining that misfiring in at least one of the plurality of cylinders has occurred based on the magnitude of the predetermined frequency.

2. The method of claim 1, wherein:
   the spectral analysis includes a Fourier decomposition of the temporal signature of the lateral displacement of the engine onto a plurality of Fourier base functions and their associated Fourier coefficients;
   each of the plurality of Fourier base functions is associated with a corresponding one of the plurality of frequencies; and
   the associated magnitudes are the associated Fourier coefficients.

3. The method of claim 1, wherein when misfiring in the at least one of the plurality of cylinders has occurred, the magnitude of the predetermined frequency is a greatest magnitude from magnitudes associated with the plurality of frequencies obtainable from the spectral analysis.

4. The method of claim 1, wherein the predetermined frequency is half of a frequency corresponding to a speed of the engine.

5. The method of claim 1, wherein the predetermined frequency is a lowest one of the plurality of frequencies.

6. The method of claim 1, wherein determining that misfiring in at least one of the plurality of cylinders has occurred based on the magnitude of the predetermined frequency includes:
   comparing one of the magnitude and an increase of magnitude of the predetermined frequency with historical values of a corresponding one of the magnitude and increases of the magnitude of the predetermined frequency.

7. The method of claim 1, wherein determining that misfiring in at least one of the plurality of cylinders has occurred based on the magnitude of the predetermined frequency includes:
   comparing one of the magnitude and an increase of magnitude of the predetermined frequency with a corresponding one of predetermined magnitudes and predetermined increases of the magnitude of the predetermined frequency corresponding to a normal operating condition.

8. The method of claim 1, wherein when misfiring in the at least one of the plurality of cylinders has occurred, the magnitude of the predetermined frequency is a greatest magnitude from magnitudes associated with the plurality of frequencies obtainable from the spectral analysis; and
   determining that misfiring in at least one of the plurality of cylinders has occurred based on the magnitude of the predetermined frequency includes:
   determining a plurality of magnitudes associated with a plurality of predetermined comparison frequencies, the plurality of predetermined comparison frequencies being other than the predetermined frequency;
   adding the plurality of magnitudes together to obtain a cumulated magnitude;
   comparing the magnitude of the predetermined frequency with the cumulated magnitude; and determining that misfiring in at least one of the plurality of cylinders has occurred when the magnitude of the predetermined frequency is greater than the cumulated magnitude.

9. The method of claim 8, wherein the engine is a V-6 engine having two banks of three cylinders each;
the predetermined frequency is a frequency corresponding to half of a speed of the engine;
the order associated to the predetermined frequency is the $0.5^{th}$ order; and
the at least some of the plurality of frequencies include orders integers from 1 to 10.

10. The method of claim 1, wherein determining that misfiring in at least one of the plurality of cylinders has occurred based on the magnitude of the predetermined frequency includes:
determining a health condition of the engine based on the magnitude of the predetermined frequency and on the temporal signature of the lateral displacement of the engine; and
comparing the health condition with a predetermined health condition value.

11. The method of claim 1, further comprising determining a cylinder in which firing should have occurred when misfiring in at least one of the plurality of cylinders has been determined.

12. The method of claim 11, wherein determining a cylinder in which firing should have occurred includes:
determining a phase angle associated with the predetermined frequency, the predetermined frequency being associated with phases angles which, for a given engine speed, are distinct when the engine has a distinct one of the plurality of cylinders in which misfiring has occurred;
determining the engine speed;
accessing a plurality of predetermined data, the plurality of predetermined data including a plurality of phase angles of the predetermined frequency versus engine speed data for when the engine has a distinct one of the plurality of cylinders in which misfiring has occurred; and
correlating the phase angle and the engine speed with the plurality of predetermined data to identify the cylinder in which firing should have occurred.

13. The method of claim 11, wherein determining a cylinder in which firing should have occurred includes:
switching off the plurality of cylinders one by one until a resulting magnitude of the predetermined frequency decreases.

14. A method of detecting misfire in an internal combustion engine, the engine having a plurality of cylinders, a corresponding plurality of pistons, and a shaft operatively connected to the plurality of pistons, the shaft having a longitudinal axis about which the shaft rotates, the method comprising:
sensing a temporal signature of a lateral displacement of the engine via an acceleration sensor, the acceleration sensor sensing the lateral displacement in at least one direction, the at least one direction being non-parallel relative to the longitudinal axis of the shaft, the acceleration sensor being connected to a control unit, the temporal signature being decomposable into a plurality of frequencies, associated magnitudes, and associated phase angles, each of the plurality of frequencies being associated with a corresponding one of a plurality of orders of the engine;
sending a signal corresponding to the temporal signature of the lateral displacement from the acceleration sensor to the control unit;
processing the signal with the control unit, the processing comprising:
performing a spectral analysis of the temporal signature of the lateral displacement to extract magnitudes of at least some of the plurality of frequencies;
adding the magnitudes of the at least some of the plurality of frequencies to obtain an added magnitude; and
determining that misfiring in at least one of the plurality of cylinders has occurred based on the added magnitude.

15. The method of claim 14, wherein misfiring in at least one of the plurality of cylinders has occurred when the added magnitude is greater than one of an historical value of the added magnitude and a predetermined value of the added magnitude.

16. A method of detecting misfire in an internal combustion engine, the engine having a plurality of cylinders, a corresponding plurality of pistons, and a shaft operatively connected to the plurality of pistons, the shaft having a longitudinal axis about which the shaft rotates, the method comprising:
sensing a temporal signature of a lateral displacement of the engine via an acceleration sensor, the acceleration sensor sensing the lateral displacement in at least one direction, the at least one direction being non-parallel relative to the longitudinal axis of the shaft, the acceleration sensor being connected to a control unit;
sending a signal corresponding to the temporal signature of the lateral displacement from the acceleration sensor to the control unit;
filtering the signal with the control unit to obtain an engine displacement component associated with frequencies below a predetermined frequency and an engine displacement component associated with frequencies above the predetermined frequency; and
determining that misfiring in at least one of the plurality of cylinders has occurred based on a comparison between the engine displacement component associated with frequencies below the predetermined frequency and the engine displacement component associated with frequencies above the predetermined frequency.

17. The method of claim 16, wherein misfiring in at least one of the plurality of cylinders has occurred when the engine displacement component associated with frequencies below the predetermined frequency is greater than the engine displacement component associated with frequencies above the predetermined frequency.

18. A vehicle comprising:
a frame;
an internal combustion engine mounted to the frame, the internal combustion engine including:
a plurality of cylinders;
a plurality of pistons, each of the plurality of piston being movably connected to a corresponding one of the plurality of cylinders; and
a shaft operatively connected to the plurality of pistons, the shaft having a longitudinal axis about which the shaft rotates;
a plurality of engine mounts for mounting the engine to the frame;
an acceleration sensor mounted on the engine, the acceleration sensor sensing a temporal signature of a lateral displacement of the engine in at least one direction, the at least one direction being non-parallel relative to the longitudinal axis of the shaft, the temporal signature being decomposable into a plurality of frequencies, associated magnitudes, and associated phase angles, each of the plurality of frequencies being associated with a corresponding one of a plurality of orders of the engine;

a control unit connected to the acceleration sensor, the acceleration sensor sending a signal corresponding to the temporal signature of the lateral displacement to the control unit, the control unit processing the signal, the processing consisting in:

performing a spectral analysis of the temporal signature of the lateral displacement to extract a magnitude of a predetermined frequency, the predetermined frequency being associated with one of the plurality of orders of the engine, the one of the plurality of orders being representative of engine lateral displacement due to in-cylinder pressures; and determining that misfiring in at least one of the plurality of cylinders has occurred based on the magnitude of the predetermined frequency.

19. The vehicle of claim 18, wherein when misfiring in at least one of the plurality of cylinders has occurred, the magnitude of the predetermined frequency is the greatest magnitude from the magnitudes associated with the plurality of frequencies obtained from the spectral analysis.

20. The vehicle of claim 18, wherein determining that misfiring in at least one of the plurality of cylinders has occurred based on the magnitude of the predetermined frequency includes the control unit to compare the magnitude of the predetermined frequency with one of historical values of the magnitude of the predetermined frequency, predetermined magnitudes of the predetermined frequency corresponding to a normal operating condition, and a cumulated magnitude of magnitudes associated with a plurality of predetermined comparison frequencies, the plurality of predetermined comparison frequencies being other than the predetermined frequency.

21. The vehicle of claim 18, wherein the engine is a V-6 engine having two banks of three cylinders each.

22. The vehicle of claim 18, wherein the shaft is one of a crankshaft and a camshaft of the engine.

23. The vehicle of claim 18, further comprising an engine casing and a gear case; and wherein the acceleration sensor is disposed on one of an engine casing and a gear case of the engine.

* * * * *